(12) United States Patent
Yamamoto et al.

(10) Patent No.: US 6,392,991 B1
(45) Date of Patent: May 21, 2002

(54) COMMUNICATION NETWORK, NODE APPARATUS USED IN THE NETWORK, AND THEIR CONTROL METHOD

(75) Inventors: Takahisa Yamamoto; Toru Nakata, both of Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/111,204

(22) Filed: Jul. 7, 1998

(30) Foreign Application Priority Data

Jul. 8, 1997 (JP) .............................................. 9-182468

(51) Int. Cl.⁷ ........................... H04L 12/42; H04L 12/56
(52) U.S. Cl. ....................... 370/222; 370/248; 370/403; 370/424; 709/251
(58) Field of Search ............................... 370/217, 221, 370/222, 223, 224, 248, 249, 250, 257, 258, 389, 395, 400, 403, 423, 424, 452, 460, 462; 709/238, 251

(56) References Cited

U.S. PATENT DOCUMENTS 4,195,351 A  *  3/1980  Barner et al. ............... 364/900
5,600,631 A  *  2/1997  Takatori et al. ............. 370/217
5,613,069 A  *  3/1997  Walker ................... 395/200.15
5,613,070 A  *  3/1997  Born ..................... 395/200.15
5,768,272 A  *  6/1998  Rao et al. .................... 370/395

* cited by examiner

*Primary Examiner*—Alpus H. Hsu
(74) *Attorney, Agent, or Firm*—Morgan & Finnegan, L.L.P.

(57) ABSTRACT

In a communication network, a ring network is formed with switches connected to a number of parallel channels. Terminal devices are also connected to the parallel channels and supply an input signal. The switches receive the input signal from each of the channels and output it to other channels. The network is configured so that the input signal passes through the switches not less than twice before the signal reaches a destination terminal device. A signal passed through a switch once will reach its destination if that switch designates a channel. Instead, that signal is output using an arbitrary channel in place of being output using the designated channel. Once the signal has made its journey around the ring once, it is output by designating a channel. Since the last switch receives the signal from an arbitrary channel, a broad communication band can be assured.

35 Claims, 14 Drawing Sheets

A : NON-SEPARATION BIT
N : NODE NUMBER
T : TRANSMISSION CHANNEL NUMBER
OTHER : SYNC SIGNAL, ERROR CORRECTION CODE, AND THE LIKE

FIG. 4

| INPUT TERMINAL \ CONTROL ADDRESS | A1 | A2 | A3 | A4 | A5 | A6 | A7 | A8 |
|---|---|---|---|---|---|---|---|---|
| IN1 | OUT1 $\lambda 1$ | OUT2 $\lambda 2$ | OUT3 $\lambda 3$ | OUT4 $\lambda 4$ | OUT5 $\lambda 5$ | OUT6 $\lambda 6$ | OUT7 $\lambda 7$ | OUT8 $\lambda 8$ |
| IN2 | OUT2 $\lambda 2$ | OUT3 $\lambda 3$ | OUT4 $\lambda 4$ | OUT5 $\lambda 5$ | OUT6 $\lambda 6$ | OUT7 $\lambda 7$ | OUT8 $\lambda 8$ | OUT1 $\lambda 1$ |
| IN3 | OUT3 $\lambda 3$ | OUT4 $\lambda 4$ | OUT5 $\lambda 5$ | OUT6 $\lambda 6$ | OUT7 $\lambda 7$ | OUT8 $\lambda 8$ | OUT1 $\lambda 1$ | OUT2 $\lambda 2$ |
| IN4 | OUT4 $\lambda 4$ | OUT5 $\lambda 5$ | OUT6 $\lambda 6$ | OUT7 $\lambda 7$ | OUT8 $\lambda 8$ | OUT1 $\lambda 1$ | OUT2 $\lambda 2$ | OUT3 $\lambda 3$ |
| IN5 | OUT5 $\lambda 5$ | OUT6 $\lambda 6$ | OUT7 $\lambda 7$ | OUT8 $\lambda 8$ | OUT1 $\lambda 1$ | OUT2 $\lambda 2$ | OUT3 $\lambda 3$ | OUT4 $\lambda 4$ |
| IN6 | OUT6 $\lambda 6$ | OUT7 $\lambda 7$ | OUT8 $\lambda 8$ | OUT1 $\lambda 1$ | OUT2 $\lambda 2$ | OUT3 $\lambda 3$ | OUT4 $\lambda 4$ | OUT5 $\lambda 5$ |
| IN7 | OUT7 $\lambda 7$ | OUT8 $\lambda 8$ | OUT1 $\lambda 1$ | OUT2 $\lambda 2$ | OUT3 $\lambda 3$ | OUT4 $\lambda 4$ | OUT5 $\lambda 5$ | OUT6 $\lambda 6$ |
| IN8 | OUT8 $\lambda 8$ | OUT1 $\lambda 1$ | OUT2 $\lambda 2$ | OUT3 $\lambda 3$ | OUT4 $\lambda 4$ | OUT5 $\lambda 5$ | OUT6 $\lambda 6$ | OUT7 $\lambda 7$ |

COMMUNICATION NETWORK, NODE APPARATUS USED IN THE NETWORK, AND THEIR CONTROL METHOD

BACKGROUND OF THE INVENTION

1. Field of the Invention

The present invention relates to a communication network and its control method and, more particularly, to a network system which has a node apparatus that can connect a plurality of terminal devices, and parallel multiplex transmission paths for connecting a plurality of node apparatuses.

2. Description of the Related Art

In recent years, as the information volume increases, a network that connects node apparatuses via parallel multiplex transmission paths is being examined to realize a high-speed, large-capacity network which connects terminal devices. For example, examples of the arrangement of such system are described in Japanese Laid-Open Patent Nos. 8-172394 and 8-237306.

In a node apparatus described in Japanese Laid-Open Patent Nos. 8-172394 and 8-237306, one terminal device is connected to each of eight parallel multiplex transmission paths (eight channels), and a packet transmitted from a certain terminal device is output to the channel to which that terminal device is connected in the node apparatus and is then input to an switch fabric of the node apparatus.

The packet is inserted into another channel in the switch fabric, and is then output to a neighboring node apparatus.

The switch fabric used in the node apparatus has eight input terminals and eight output terminals, and sequentially connects these input and output terminals according to specific patterns so as to prevent the input terminals from being connected to a single output terminal in an identical time band, thus switching the channels (see Japanese Laid-Open Patent Nos. 8-172394 and 8-237306 for more).

When communications are made between such node apparatuses, since a terminal device is connected to a given channel, an upstream neighboring node apparatus of the node apparatus to which the destination terminal device of a packet is connected transmits the packet onto the channel to which the destination terminal device is connected.

However, in the above-mentioned prior art, if the destination terminal device of the packet transmitted from a given terminal device is connected to a downstream neighboring node apparatus of the node apparatus to which the source terminal device is connected, the communication band narrows as compared to a case wherein the packet is transmitted to a terminal device connected to another node apparatus.

More specifically, when a packet is transmitted to a terminal device other than that connected to the downstream neighboring node apparatus of the node apparatus to which the source terminal device is connected, the node apparatus to which the source terminal device is connected can transmit that packet using an arbitrary one of a plurality of channels. However, when the packet is transmitted to a terminal device connected to the downstream neighboring node apparatus, the node apparatus must transmit the packet using only the channel to which the destination terminal device is connected.

Hence, in the above-mentioned prior art, communications can be made even when the node apparatus to which the destination terminal device neighbors on the downstream side of the node apparatus to which the source terminal device is connected, but the communication band narrows as compared to a case wherein the node apparatus to which the destination terminal device is connected does not neighbor on the downstream side of the node apparatus to which the source terminal device is connected.

A reference example that partially quotes the arrangement of Japanese Laid-Open Patent No. 8-237306 will be described below to explain the prior art in more detail.

FIG. 5 is a diagram showing the arrangement of a node apparatus in a network of the reference example, and exemplifies an arrangement in which terminals 551 to 558 are connected to a node apparatus 500 via sub transmission paths. Reference numerals 501 to 508 denote separation/insertion units serving as separation/insertion means. Each separation/insertion unit has a function of detecting the addresses of packets input from the corresponding parallel multiplex transmission path, separating them into those to be transmitted to the terminal and those to be input to a buffer, and inserting a packet transmitted from the terminal into a packet flow input form the parallel multiplex transmission path. Reference numerals 511 to 518 denote buffers serving as buffer means each having a function of temporarily storing a packet output from the corresponding separation/insertion unit in a storage area corresponding to the output terminal of a switch 541. Reference numerals 521 to 528 and 531 to 538 denote parallel multiplex transmission paths as a plurality of parallel channels to connect neighboring nodes. These transmission paths are realized by, e.g., a plurality of space division multiplexing optical fiber transmission paths, or wavelength multiplex transmission paths which are wavelength-divided and multiplexed on a single optical fiber. Reference numeral 541 denotes a switch, which is controlled by a switch controller 542 to connect packets input to its input terminals IN1 to IN8 to arbitrary output terminals OUT1 to OUT8. The switch 541 attains switching using a space division switch or the like when a plurality of optical fiber transmission paths are used as the parallel multiplex transmission paths. On the other hand, when wavelength multiplex transmission paths are used, the switch 541 between neighboring nodes is constructed by connecting a transmitter comprising a plurality of variable wavelength laser diodes and a wavelength multiplexer to the wavelength multiplex transmission paths, and separating the respective wavelengths using a wavelength demultiplexer in a receiver of the wavelength multiplex transmission paths, and switches by setting the transmission wavelengths of the variable wavelength laser diodes at arbitrary wavelengths $\lambda 1$ to $\lambda 8$. Reference numeral 542 denotes a switch controller which controls the switch according to control patterns shown in, e.g., FIG. 4. Reference numeral 543 denotes a buffer controller which controls the buffers to read out the stored packets when the input terminals of the switch connected to the individual buffers are connected to desired output terminals.

FIG. 8 shows the internal arrangement of each of the separation/insertion units 501 to 508. Reference numeral 801 denotes a header detector for detecting the destination address from a packet header; 802 and 803, gates for outputting or intercepting the input signals; 804, a selector for outputting one of the two input signals; and 805, a FIFO (First In First Out) for temporarily storing a packet. In each of the separation/insertion units 501 to 508, the header detector 801 detects the header of a packet input from the corresponding parallel multiplex transmission path, and the gates 802 and 803 are opened/closed depending on the header contents. The header detector 801 pre-stores the address of a terminal connected to that separation/insertion unit, and when the detected destination address matches the stored address, the gates 803 and 802 are respectively opened and closed to output that packet in only the terminal direction. When the detected destination address does not match the stored address, the gates 802 and 803 are respectively opened and closed to output that packet to only the selector, and the packet is sent to the buffer via the selector 804. On the other hand, a packet transmitted from the terminal is temporarily stored in the FIFO 805, and is read out therefrom when the packet flow input from the gate 802 to the selector 804 has a space. Then, the packet is sent to the buffer via the selector 804.

FIG. 3 shows the internal arrangement of each of the buffers 511 to 518. Reference numeral 301 denotes a buffer memory having storage areas 1 to 8 corresponding to the output terminals of the switch 541; 302, a header detector for detecting the destination address from a packet header; and 303, an address counter for supplying a write address to the buffer memory 301. In each of the buffers 511 to 518, a header is detected by the header detector 302 from a packet input from the corresponding separation/insertion unit, and a storage area that stores the packet is determined by the header contents. The header detector 302 pre-stores the addresses of terminals connected to the downstream neighboring node. When the detected destination address matches one of the stored addresses, the header detector 302 designates a storage area corresponding to the transmission path to which the destination terminal is connected, i.e., the output terminal of the switch 541, and makes the address counter 303 generate a write address, thus storing the packet on the buffer memory 301. On the other hand, when the detected destination address matches none of the stored addresses, the header detector 302 controls to store that packet in an arbitrary storage area.

FIG. 4 shows control patterns that represent the input/output connections of the switch 541. The input/output connection of the switch is changed by control addresses A1 to A8. The input terminals IN1 to IN8 respectively correspond to buffers 511 to 518 (input channels 521 to 528), and the output terminals OUT1 to OUT8 (or transmission wavelengths λ1 to λ8) respectively correspond to channels 531 to 538.

The switch 541 and buffers 1 to 8 (511 to 518) are synchronously controlled. For example, when buffer 1 is connected to the channel 531, a packet stored in storage area I corresponding to channel 531 is read out from buffer 1. When buffer 1 is connected to the channel 532, a packet stored in a storage area corresponding to the channel 532 is read out from the buffer 1.

FIG. 6 shows an example of the arrangement of a network system using the node apparatuses shown in FIG. 5. Four node apparatuses 601 to 604 are connected in a ring pattern via parallel multiplex transmission paths 605 to 608, and eight terminals are connected to each node apparatus via eight sub transmission paths. Terminals 611 to 618 correspond to the terminals 511 to 558, and similarly, terminals 621 to 628, 631 to 638, and 641 to 648 correspond to the terminals 551 to 558.

FIG. 7 is a diagram for explaining the communication principle of this network. Reference numerals 701 to 704 denote node apparatuses; 705 to 708, switch fabrics corresponding to the switch 541; 709 to 712, buffers corresponding to the buffers 511 to 518; 721 to 736, terminals; and A, B, C, and D, parallel transmission paths that form rings.

The communication principle of this network will be explained below with reference to FIG. 7. This network has a plurality of rings A, B, C, and D, which are connected to each other via the switch fabrics 705 to 708. Each terminal is connected to one of parallel ring transmission paths A, B, C, and D. When a given terminal communicates with a terminal connected to another ring, its output packet is switched at least once to another ring by an arbitrary switch fabric to attain the communication. Although the switching position is not specified, if the packet changes its transmission path to the one connected to the destination node at a node immediately before the destination node, and also changes the transmission path to an arbitrary one in other nodes, communication control is simplified. In this network, in order to simplify the node apparatus, the switch fabrics 705 to 708 repetitively change their input/output connections in accordance with predetermined patterns irrespective of their input signals. The buffers 709 to 712 temporarily store the input signals, and when the input/output connection of the switch fabric is changed to a desired one, a packet is read out from the buffer, thus attaining switching.

For example, when a packet is to be sent from the terminal 722 to the terminal 732, the packet output from the terminal 722 is stored in the buffer 709 of the node 701, and is read out therefrom when the input terminal IN1 of the switch 705 is connected to, e.g., the output terminal OUT2. The readout packet is then output onto the transmission path B, and is input to the buffer 710 of the node 702. When the input terminal IN2 of the switch 706 is connected to the output terminal OUT4, that packet is read out from the buffer, and is output onto the transmission path D. In this way, the packet is sent to the terminal 732.

As described above, a packet communication is done by changing the ring transmission path to an arbitrary one in each node device.

The network system will be explained in detail below with reference to FIGS. 5 and 6. In the following description, the parallel multiplex transmission paths use a plurality of space division multiplexing optical fiber transmission paths, and the switch uses a space division switch. However, the wavelength multiplex transmission paths may also be used based on the above-mentioned principle, and nearly the same operations are made. An example of communications from the terminal 612 to the terminal 635 will be explained.

Transmission data from the terminal 612 is broken up into packets each having a fixed length, and the destination address is added to the header of each packet, thus outputting packets. Each output packet is input to the node apparatus 601 via the sub transmission path, and is temporarily stored in the FIFO 805 of the separation/insertion unit 502. The stored packet is read out from the FIFO 805 when the packet flow input from the gate 802 to the selector 804 has a space, and is then sent to the buffer 512 via the selector 804.

Upon detecting the header of the input packet, the header detector 302 of the buffer 512 determines that a channel need not be designated for that packet, since the detected destination address does not match the stored address and, hence, designates an arbitrary storage area. Upon receiving the information, the write address counter 303 generates a write address, and that packet is written in that storage area of the buffer memory 301. In this case, assume that the packet is stored in storage area 1.

The buffer controller 543 suspends a read of that packet until the input terminal IN2 of the switch 541 is connected to the output terminal OUT1, and reads out the packet when they are connected.

The switch controller 542 sequentially supplies the control address in the order of A1, A2, A3, A4, A5, A6, A7, and A8 as in the table shown in FIG. 4 to change the connection of the switch 541. The switch controller 542 supplies the control address at, e.g., a one-packet-length period, so that identical patterns repetitively appear at eight packet periods. By supplying the information to the buffer controller 543, the read timing from the buffer is controlled. In this case, when the input terminal IN2 of the switch 541 is connected to the output terminal OUT1, the packet is read out from storage area 1 of the buffer 512, and is output onto the transmission path 531 via the switch 541.

The packet sent via the transmission path 531 is input to the separation/insertion unit 501 of the node apparatus 602, and its header is detected by the header detector 802. Since the detected destination address does not match the stored address, the gates 802 and 803 are respectively opened and closed to output that packet to the selector 804. The packet output to the selector 804 in the separation/insertion unit 501 is input to the buffer 511 via the selector 804.

Upon detecting the packet header, the header detector 302 determines that the packet is the one to be output via a designated channel, since the detected destination address matches the stored address, and designates a storage area corresponding to the transmission path to which the terminal indicated by the destination address is connected. In this case, since the destination terminal is connected to the transmission path 535, the packet is stored in storage area 5.

The buffer controller 543 in the node apparatus 602 reads out the packet from storage area 5 of the buffer 511 when the input terminal IN1 of the switch 541 is connected to the output terminal OUT5, thus outputting the packet onto the transmission path 535 via the switch 541. The packet is input to the separation/insertion unit 505 of the node apparatus 603 via the transmission path 535, and its header is detected by the header detector 802. In this case, since the detected destination address matches the stored address, the gates 803 and 802 are respectively opened and closed to output that packet in only the terminal direction. The packet output from the separation/insertion unit 505 in the terminal direction is sent to and received by the terminal 635 via the sub transmission path.

In this way, the communication is done.

When a communication is made toward a terminal connected to the downstream neighboring node apparatus in the network, the communication band narrows as compared to a communication to a terminal connected to the node apparatus other than the downstream neighboring node apparatus. This problem will be explained in detail below.

A procedure for transmitting a packet to a terminal connected to the downstream neighboring node will be explained below with reference to FIGS. 5 and 6. In the following description, the parallel multiplex transmission paths use a plurality of space division multiplexing optical fiber transmission paths, and the switch uses a space division switch. However, the wavelength multiplex transmission paths may also be used based on the above-mentioned principle, and nearly the same operations are made. An example of communications from the terminal 612 to the terminal 625 will be explained.

Transmission data from the terminal 612 is broken up into packets each having a fixed length, and the destination address is added to the header of each packet, thus outputting packets. Each output packet is input to the node apparatus 601 via the sub transmission path, and is temporarily stored in the FIFO 805 of the separation/insertion unit 502. The stored packet is read out from the FIFO 805 when the packet flow input from the gate 802 to the selector 804 has a space, and is then sent to the buffer via the selector 804.

Upon detecting the header of the input packet, the header detector 302 of the buffer 512 designates a storage area corresponding to the transmission path to which the terminal indicated by the destination address is connected, since the detected destination address matches the stored address. In this case, since the destination terminal is connected to the transmission path 535, the packet is stored in storage area 5.

The switch controller 542 sequentially supplies the control address in the order of A1, A2, A3, A4, A5, A6, A7, and A8 as in the table shown in FIG. 4 to change the connection of the switch 541. Also, the switch controller 542 supplies the control address at, e.g., a one-packet-length period, so that identical patterns repetitively appear at eight packet periods. By supplying the information to the buffer controller 543, the read timing from the buffer is controlled.

When the input terminal IN2 of the switch 541 is connected to the output terminal OUT5, the buffer controller 543 reads out the packet from storage area 5 of the buffer 512, thus outputting the packet onto the transmission path 535 via the switch 541. The packet is input to the separation/insertion unit 505 of the node apparatus 602 via the transmission path, and its header is detected by the header detector 802. In this case, since the detected destination address matches the stored address, the gates 803 and 802 are respectively opened and closed to output that packet in only the terminal direction. The packet output from the separation/insertion unit 505 in the terminal direction is sent to and received by the terminal 625 via the sub transmission path.

In this fashion, the communication from the terminal 612 to the terminal 625 is made.

However, in this procedure, the communication band narrows as compared to a communication between non-neighboring node apparatuses, as will be described below.

The communication band between non-neighboring node apparatuses will be calculated first. Assume that the transmission band per transmission path and that of the sub transmission path between each terminal and node apparatus are respectively T bps. In case of the above reference example, i.e., the communication from the terminal 612 to the terminal 635, the communication band is calculated as follows:

1. The communication rate from the terminal 612 to the node apparatus 601 is T bps.

2. The communication rate from the separation/insertion unit 502 to the buffer 512 is T bps.

3. Since packets are written in arbitrary storage areas in the buffer 512, and storage areas 1 to 8 are read out in turn by the buffer controller 543, the communication rate from the buffer 512 to the switch 541 is T bps and, hence, that of the output from the switch 541 is also T bps (as a total of the eight transmission paths).

4. The communication rate from the node apparatus 601 to the node apparatus 602 is T bps (as a total of the eight transmission paths).

5. The communication rate between the separation/insertion units 501 to 508 and buffers 511 to 518 in the node apparatus 602 is T bps (as a total of the eight transmission paths).

6. Since the packets are written in storage areas 5 in buffers 511 to 518, and these storage areas 5 are read out at different timings, the communication rate from the buffers 511 to 518 to the switch 541 is T bps.

7. Since the packets are read out and input to the switch 541 via the input terminals IN1 to IN8 and are switched to the output terminal OUT5 at different timings, the communication rate is T bps and, hence, that of the output from the switch 541 is T bps (the transmission path 535 alone).

8. The communication rate from the node apparatus 602 to the node apparatus 603 is T bps (single transmission path).

9. The communication rate from the separation/insertion unit 505 in the node apparatus 603 to the terminal 635 is T bps.

Hence, since the communication rate throughout the communication path is T bps, the communication band of the communication from the terminal 612 to the terminal 635 is T bps.

By contrast, the communication band of the communication from the terminal 612 to the terminal 625 is calculated as follows:

1. The communication rate from the terminal 612 to the node apparatus 601 is T bps.

2. The communication rate from the separation/insertion unit 502 to the buffer 512 is T bps.

3. Since packets are written in storage area 5 in the buffer 512, and storage area 5 is read out by the buffer controller 543 at a timing once per eight packet periods, the communication rate from the buffer 512 to the switch 541 is T/8 bps. Hence, the communication rate of the output from the switch 541 is also T/8 bps.

4. The communication rate from the node apparatus 601 to the node apparatus 602 is T bps (single transmission path).

5. The communication rate from the separation/insertion unit 505 of the node apparatus 602 to the terminal 625 is T bps.

Hence, the rate of 3. becomes a bottleneck (T/8 bps), and the communication band of the communication from the terminal 612 to the terminal 625 becomes T/8 bps.

SUMMARY OF THE INVENTION

It is an object of the present invention to prevent the communication band from narrowing even when the destination terminal of a packet transmitted from a given terminal device is connected to the downstream neighboring node apparatus of the node apparatus to which the source terminal device of that packet is connected.

It is another object of the present invention to prevent the communication band from narrowing even when the destination terminal of a packet transmitted from a terminal device connected to a node apparatus, which switches packets by connecting a plurality of input terminals and a plurality of output terminals in accordance with predetermined patterns that can prevent a plurality of input terminals from being simultaneously connected to a single output terminal, is connected to the downstream neighboring node apparatus of that node apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a table showing the control rule of buffers and a switch;

DESCRIPTION OF THE PREFERRED EMBODIMENTS

First Embodiment

The first embodiment of the present invention will now be described.

A communication network of the present invention uses the packet header format and the arrangements of the insertion/separation unit and buffer different from those in the network of the reference example, so as to solve the "problem that the communication band narrows in case of a communication to a terminal connected to the downstream neighboring node apparatus as compared to a communication to a terminal connected to a node apparatus other than the downstream neighboring node apparatus" in the network of the above reference example.

Figure 1:
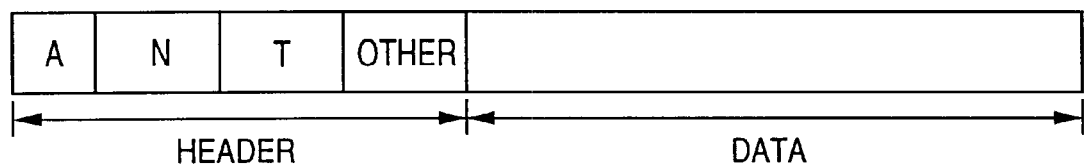
FIG. 1 is a view showing the format of a packet used in a network according to an embodiment of the present invention.

FIG. 1 shows the format of a packet used in the network of this embodiment. Reference symbol A denotes a non-separation bit. The non-separation bit is 1 bit, and is set at "1" when a packet is inhibited from being separated by a separation/insertion unit II (to be described later) in a node apparatus to which a receiving terminal is connected; or "0" when a packet is allowed to be separated by the separation/insertion unit II in the node apparatus to which the receiving terminal is connected. Reference symbol N denotes a node number. If 32 node apparatuses can be connected, the node number N consists of 5 bits capable of expressing node numbers 1 to 32. Reference symbol T denotes a channel number. If the number of transmission channels (the number of wavelengths to be multiplexed) of parallel multiplex transmission paths is 8, the channel number T consists of 3 bits capable of expressing numbers 1 to 8. In addition, a sync signal, error correction code, and the like are inserted in the packet as needed.

In this embodiment, terminals in the network are connected to the separation/insertion units II to have one-to-one correspondence therebetween, and one separation/insertion unit II is inserted for each channel in each node. In order to identify the separation/insertion unit II, the node and channel to which the unit II is connected need only be detected. Hence, in this embodiment, each terminal is identified by the node number and transmission channel number.

Figure 2:
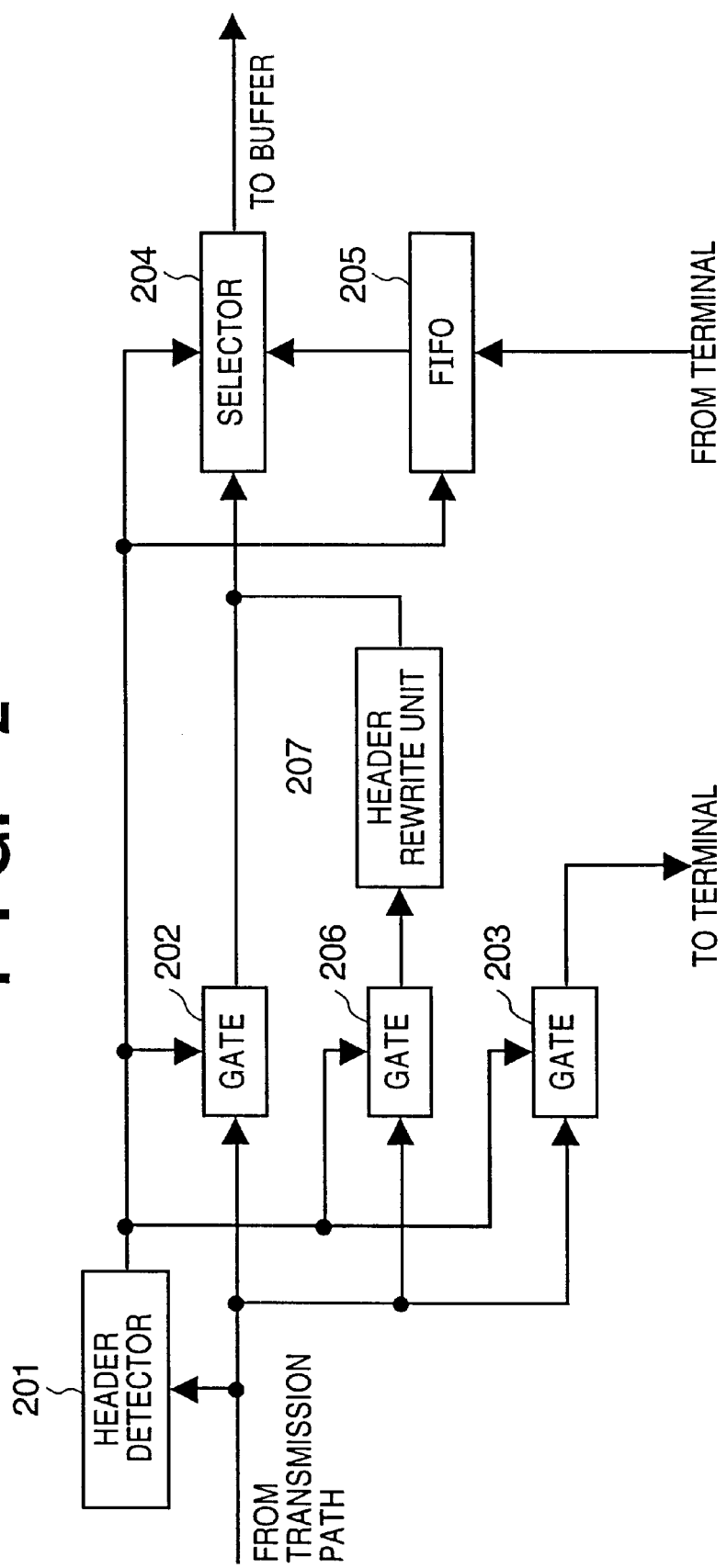
FIG. 2 is a block diagram showing the internal arrangement of a separation/insertion unit II of a node apparatus according to the first embodiment of the present invention.
Figure 3:
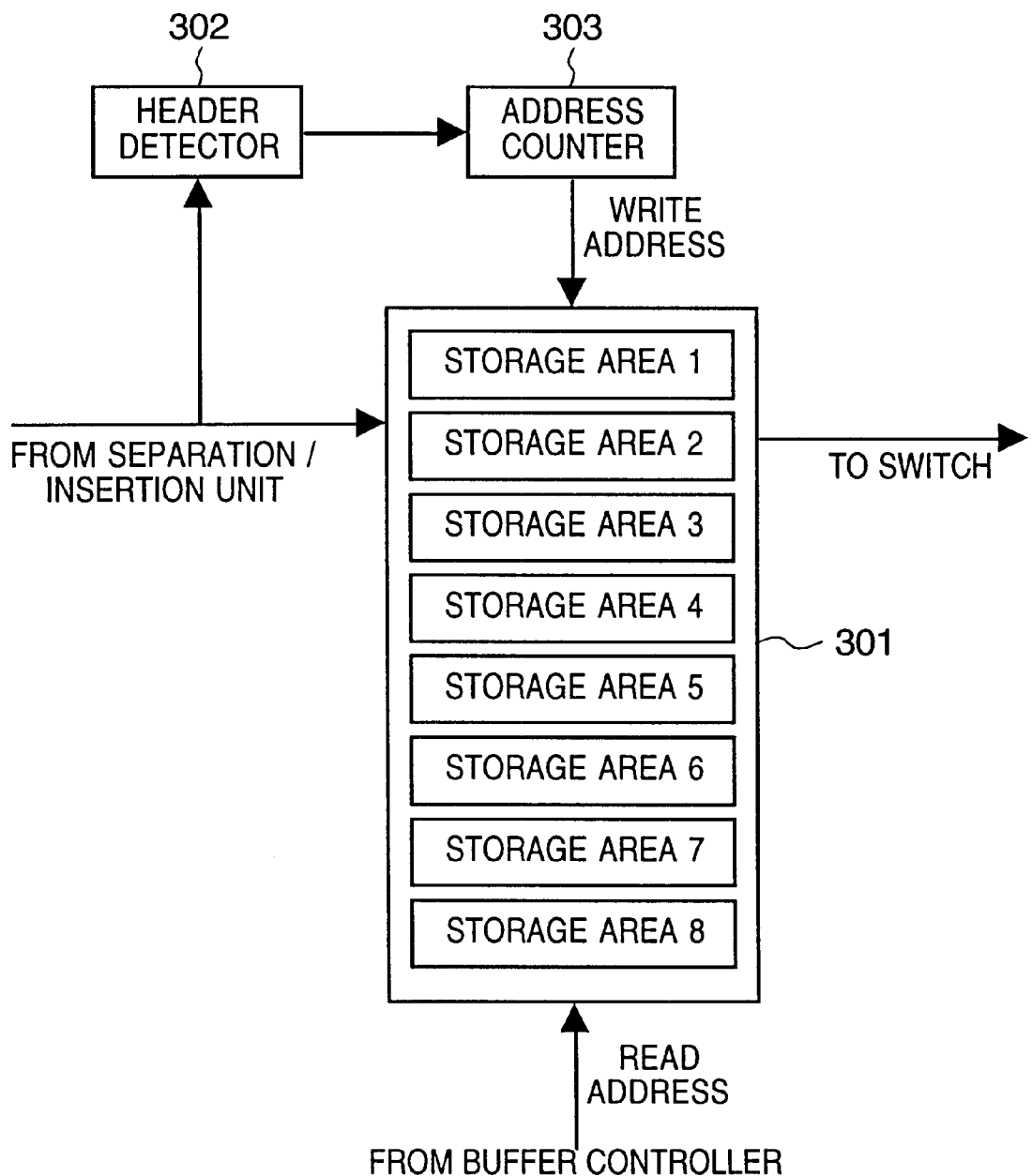
FIG. 3 is a block diagram showing the internal arrangement of a buffer in a conventional node apparatus.

FIG. 2 shows the internal arrangement of each of separation/insertion units II 901 to 908. A header detector 201 detects the header (A, N) of a packet input from a transmission path, and open/close-controls gates 202, 203, and 206 depending on the header contents. A header rewrite unit 207 rewrites the non-separation bit from 1 to 0.

The header detector 201 pre-stores the node number of its own node (to be referred to as an own node number hereinafter).

The header detector 201 controls the packet route as follows:

1. When the detected node number (N) matches the stored own node number, and that the non-separation bit (A)=1 is detected, the detector 201 opens the gate 206 and closes the gates 202 and 203 to output a packet, the header A field of which has been rewritten to be 0 by the header rewrite unit 207, in only the direction of the buffer II (to be described later).

2. When the detected node number (N) matches the stored own node number, but that the non-separation bit (A)=0 is detected, the detector 201 opens the gate 203 and closes the gates 202 and 206 to output a packet on only the terminal direction.

3. In a case other than 1. and 2. above, the detector 201 opens the gate 202 and closes the gates 203 and 206 to output a packet in only the direction of the buffer II.

Figure 10:
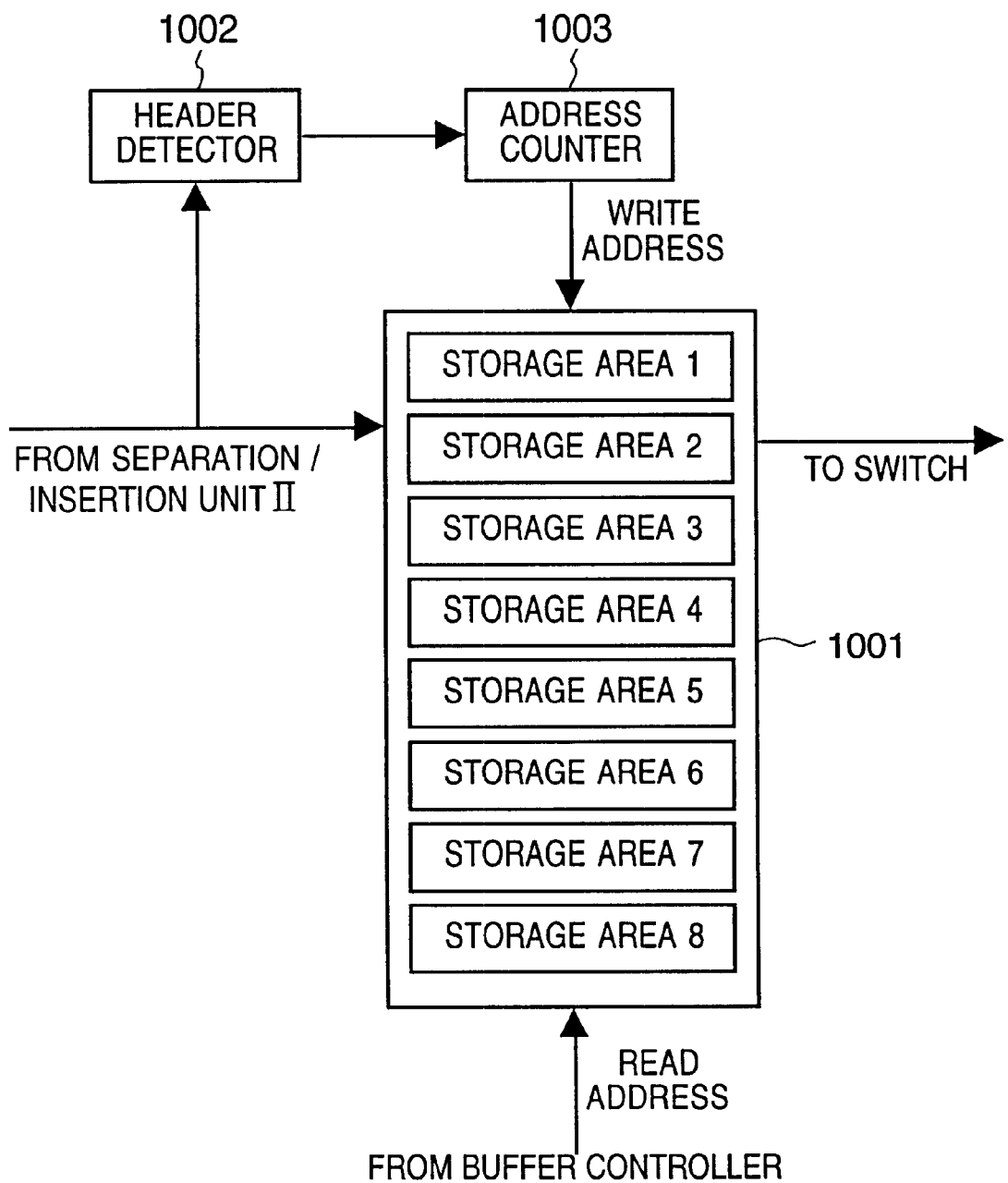
FIG. 10 is a block diagram showing the arrangement of a buffer II according to the first embodiment of the present invention.

FIG. 10 shows the internal arrangement of each of buffers II 911 to 918. Reference numeral 1001 denotes a buffer memory which has storage areas 1 to 8 corresponding to the output terminals of the respective channels; 1002, a header detector for detecting the bits A, N, and T from the packet header; and 1003, an address counter for supplying a write address to the buffer memory 1001.

In each of the buffers II 911 to 918, the header detector 1003 detects the header of a packet input from the corresponding separation/insertion unit II, and determines a storage area that stores the packet depending on the header contents.

The header detector 1002 pre-stores the node number of the downstream neighboring node (to be referred to as a downstream node number hereinafter), and the transmission channel number of the parallel multiplex transmission path to which each buffer II is connected via the separation/insertion unit II.

The header detector 1002 controls a packet as follows:

1. When the detected node number (N) matches the stored downstream node number but that the non-separation bit (A)=0 is detected, the detector 1002 stores the packet in the buffer memory 801 by designating a storage area corresponding to the detected transmission channel number (T) to make the address counter 1003 generate a write address.

2. In a case other than 1. above, the detector 1002 stores the packet in the buffer memory 1001 by designating an arbitrary storage area to make the address counter 1003 generate a write address.

Figure 5:
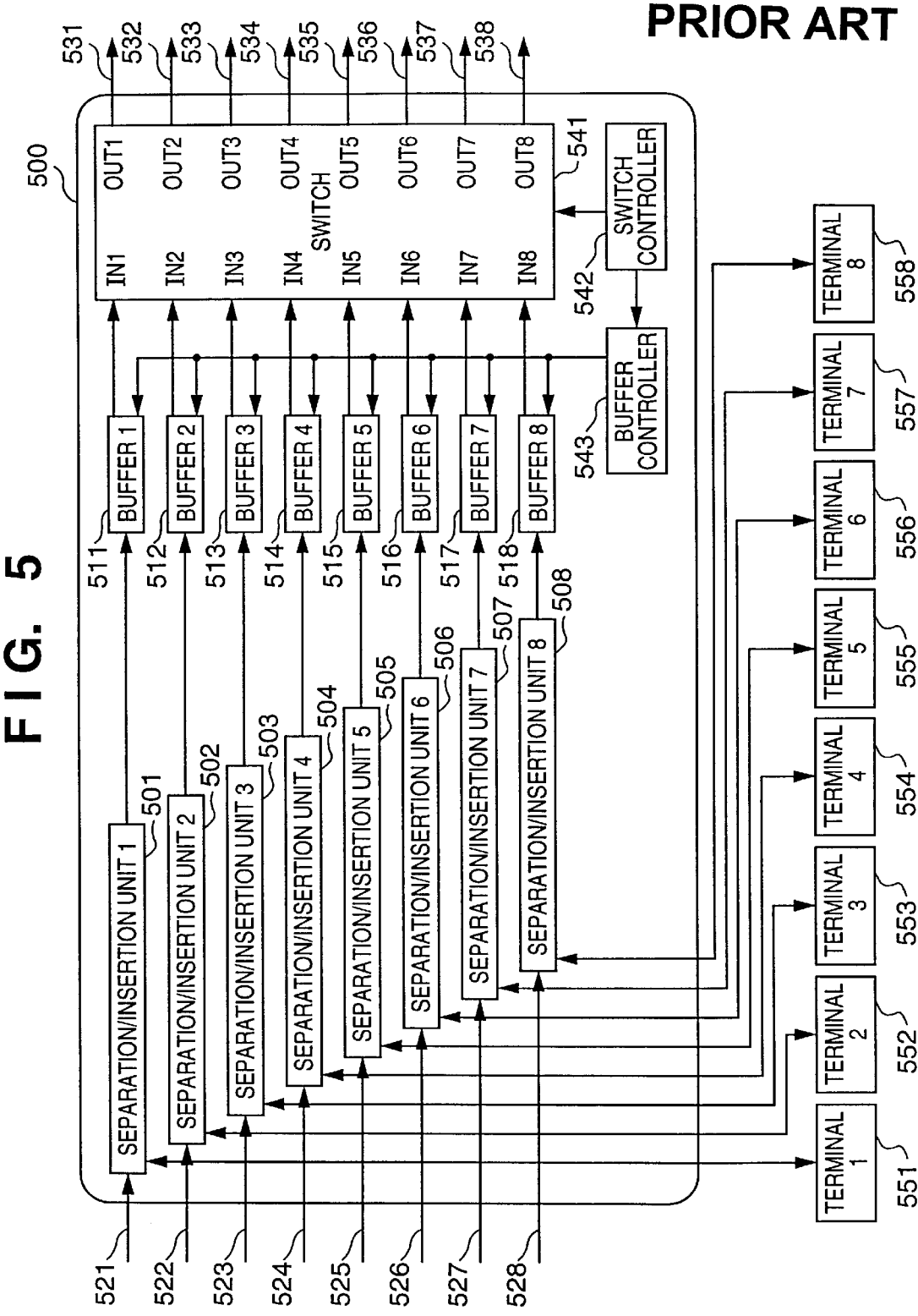
FIG. 5 is a block diagram showing the arrangement of the conventional node apparatus.
Figure 9:
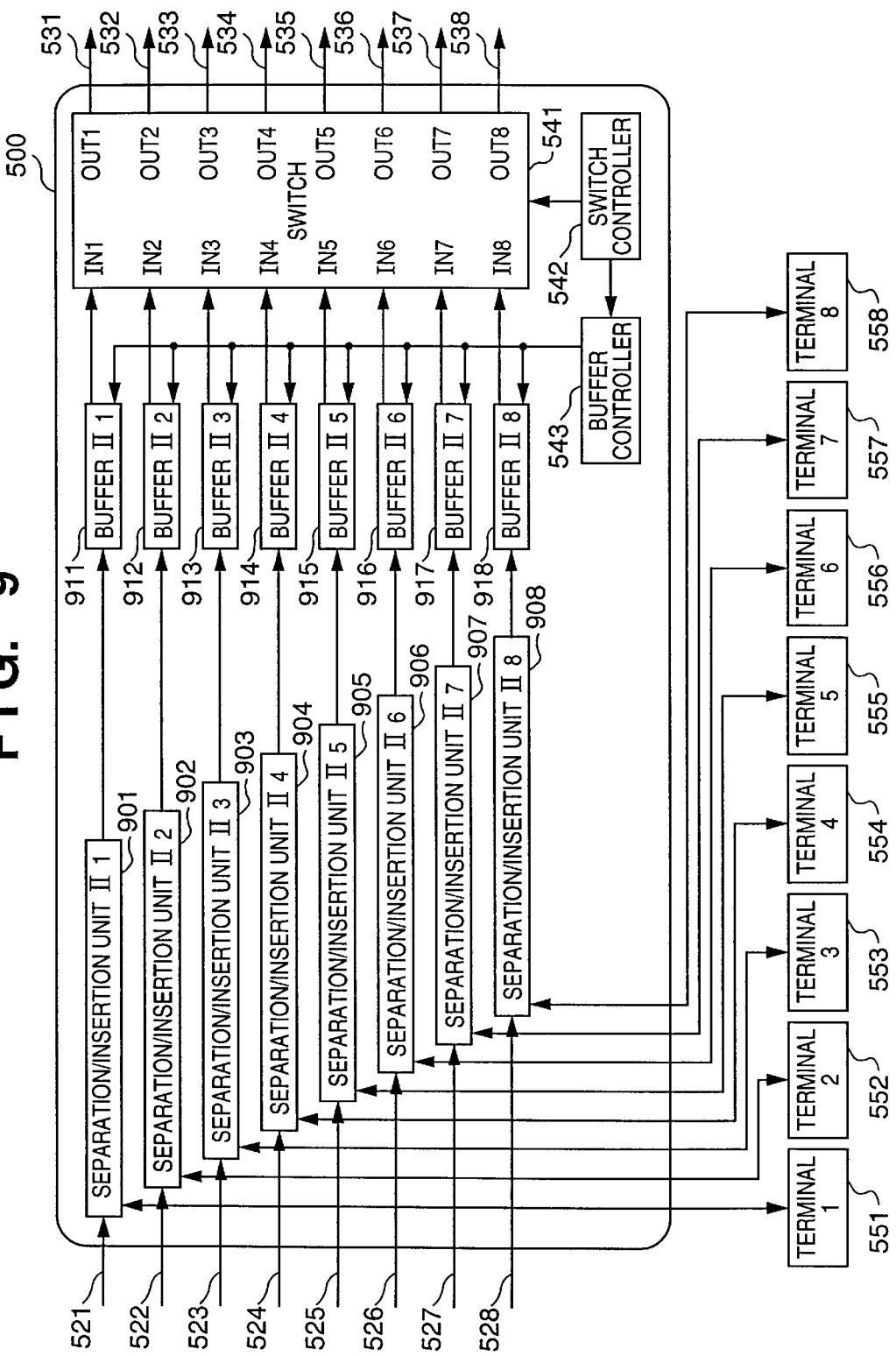
FIG. 9 is a block diagram showing the arrangement of a node apparatus according to the first embodiment of the present invention.

The arrangement of the node apparatus in this embodiment is substantially the same as that of the node apparatus of the reference example shown in FIG. 5, except for the internal arrangements of the separation/insertion units II and buffers II. FIG. 9 shows the node apparatus using the separation/insertion units II and buffers II. Since the network arrangement is the same as that shown in FIG. 6, the network of this embodiment will be explained below with reference to FIGS. 9 and 6. A communication to a terminal connected to a node apparatus other than the downstream neighboring node apparatus in the network using the node apparatuses will be explained first. A case will be exemplified below wherein a signal is to be transmitted from a terminal 612 (own node number: 1, transmission channel number: 2) to a terminal 635 (own node number: 3, transmission channel number: 5).

1. The terminal 612 sets the terminal number (e.g., N=3, T=5) and bit A=0 in the header of a packet, and outputs that packet. The packet is input to the separation/insertion unit II 902 of the node apparatus 601 via the sub transmission path.

2. A selector 204 of the separation/insertion unit II 902 inserts the packet coming from the terminal in a space of a packet flow input from the transmission path, and outputs that packet flow to the buffer II 912.

3. The header detector 1002 of the buffer II 912 detects the header of the input packet. Since the detected node number (N=3) does not match the neighboring node number (2), the detector 1002 designates an arbitrary storage area. In this case, for example, the detector 1002 designates storage area 1. The write address counter 1003 generates a write address upon reception of that information, and writes the packet in storage area 1 of the buffer memory 1001.

4. A switch controller 542 controls the input/output connections of a switch 541 by cyclically changing control addresses A1 to A8 at predetermined periods in accordance with the table in FIG. 4, and supplies the control address to a buffer controller 543. When the buffer controller 543 controls to read out the packet from storage area 1 of the buffer II 912 when the control address=A8, the packet is output onto a transmission path 531 via the input terminal IN2 and output terminal OUT1 of the switch 541.

5. The packet is input to the separation/insertion unit II 901 in the node apparatus 902 via the transmission path, and the header detector 201 detects the header of the packet. Since the detected node number (N=3) does not match the own node number (2), the detector 201 opens the gate 202 and closes the gates 203 and 206 to output the packet to the selector 204. 6. The packet output to the selector 204 of the separation/insertion unit II 901 is input to the buffer II 911 via the selector 204. Since the node number (N=3) detected by the header detector 1002 from the packet header matches the neighboring node number (3) and the detected A bit=0, the detector 1002 designates the storage area with the same number as the detected transmission channel number (T=5). In this case, since the transmission channel number is 5, the packet is stored in storage area 5.

7. The packet stored in storage area 5 of the buffer II 911 is read out when the control address=A5 in turn, and is output onto a transmission path 535 via the input terminal IN1 and output terminal OUT5 of the switch 541.

8. The packet input to the separation/insertion unit II 905 of the node apparatus 603 via the transmission path is input to the header detector 201 to detect its header. In this case, since the detected node number (N=3) matches the stored own node number (3) and bit A=0, the detector 201 opens the gate 203 and closes the gates 202 and 206 to output that packet in only the terminal direction.

9. The packet output from the separation/insertion unit II 905 in the terminal direction is sent to and received by the terminal 635 via the sub transmission path.

A communication with a terminal connected to the downstream neighboring node apparatus will be explained below. Assume that a signal is transmitted from the terminal 612 (own node number: 1, transmission channel number: 2) to a terminal 625 (own node number: 2, transmission channel number: 5).

1. The terminal 612 sets the terminal number (e.g., N=2, T=5) and bit A=1 in the header of a packet, and outputs that packet. The packet is input to the separation/insertion unit II 902 of the node apparatus 601 via the sub transmission path.

2. The selector 204 of the separation/insertion unit II 902 inserts the packet coming from the terminal in a space of a packet flow input from the transmission path, and outputs that packet flow to the buffer II 912.

3. The header detector 1002 of the buffer II 912 detects the header of the input packet. Since the non-separation bit (A) (A=1) is detected, the detector 1002 designates an arbitrary storage area. In this case, for example, storage area 1 is designated. Upon reception of this information, the write address counter 1003 generates a write address, and writes that packet in storage area 1 of buffer memory 1001.

4. The switch controller 542 controls the input/output connections of the switch 541 by cyclically changing control addresses A1 to A8 at predetermined periods in accordance with the table in FIG. 4, and supplies the control address to the buffer controller 543. When the buffer controller 543 controls to read out the packet from storage area 1 of the buffer II 912 when the control address=A8, the packet is output onto a transmission path 531 via the input terminal IN2 and output terminal OUT1 of the switch 541.

5. The packet is input to the separation/insertion unit II 901 in the node apparatus 902 via the transmission path, and the header detector 201 detects the header of the packet. Since the detected node number (N=2) matches the own node number (2) but bit A is 1, it is determined that the packet has passed through the switch only once. Hence, the detector 201 opens the gate 206 and closes the gates 202 and 203 to rewrite the non-separation bit (A) to 0 by the header rewrite unit 207 and then output that packet to the selector 204.

6. The packet output to the selector 204 of the separation/insertion unit II 901 is input to the buffer II 911 via the selector 204. Since the node number (N=2) detected by the header detector 1002 from the packet header does not match the neighboring node number (3) and the detected A bit=0, the detector 1002 designates an arbitrary storage area. In this case, for example, storage area 2 is designated. Upon receiving the information, the address counter 1003 generates a write address, and writes that packet in storage area 2 in the buffer memory 1001.

7. The packet stored in storage area 2 of the buffer II 911 is read out when the control address=A2 in turn, and is output onto a transmission path 532 via the input terminal IN1 and output terminal OUT5 of the switch 541.

8. The packet is input to the separation/insertion unit II 902 of the node apparatus 603 via the transmission path, and the header detector 201 detects its header. In this case, since the detected node number (N=2) does not match the stored own node number (3), the detector 201 opens the gate 202 and closes the gates 203 and 206 to output the packet in only the direction of the buffer II.

9. The packet output to the selector 204 of the separation/insertion unit II 902 is input to the buffer II 912 via the selector 204. Since the node number (N=2) detected by the header detector 1002 from the packet header does not match the stored neighboring node number (4), the detector 1002 designates an arbitrary storage area. In this case, for example, storage area 3 is designated. Upon reception of the information, the address counter 1003 generates a write address, and writes the packet in storage area 3 in the buffer memory 1001.

10. The packet stored in storage area 3 of the buffer II 912 is read out when the control address=A2 in turn, and is output onto a transmission path 533 via the input terminal IN2 and output terminal OUT3 of the switch 541.

11. The packet input to the separation/insertion unit II 903 of the node apparatus 604 via the transmission path is input to the header detector 201 to detect its header. In this case, since the detected node number (N=2) does not match the stored own node number (4), the detector 201 opens the gate 202 and closes the gates 203 and 206 to output that packet in only the buffer direction.

12. The packet output to the selector 204 of the separation/insertion unit II 903 is input to the buffer II 913 via the selector 204. Since the node number (N=2) detected by the header detector 1002 from the packet header does not match the stored neighboring node number (1), the detector 1002 designates an arbitrary storage area. In this case, for example, storage area 4 is designated. Upon reception of the information, the address counter 1003 generates a write address, and writes the packet in storage area 4 in the buffer memory 1001.

13. The packet stored in storage area 4 of the buffer II 913 is read out when the control address=A2 in turn, and is output onto a transmission path 534 via the input terminal IN3 and output terminal OUT4 of the switch 541.

14. The packet input to the separation/insertion unit II 904 of the node apparatus 601 via the transmission path is input to the header detector 201 to detect its header. In this case, since the detected node number (N=2) does not match the stored own node number (1), the detector 201 opens the gate 202 and closes the gates 203 and 206 to output that packet in only the direction of the buffer II.

15. The packet output to the selector 204 of the separation/insertion unit II 904 is input to the buffer II 914 via the selector 204. Since the node number (N=2) detected by the header detector 1002 from the packet header matches the stored neighboring node number (2) and bit A=0, it is determined that this node is the last switch means which the packet has to go through before it reaches the destination. Hence, the detector 1002 designates a storage area with the same number as the detected transmission channel number (T=5), so that the packet is output from the switch 541 in the designated channel. In this case, since the transmission channel number is 5, the packet is stored in storage area 5.

16. The packet stored in storage area 5 of the buffer II 914 is read out when the control address=A2 in turn, and is output onto the transmission path 535 via the input terminal IN4 and output terminal OUT5 of the switch 541.

17. The packet input to the separation/insertion unit II 905 of the node apparatus 602 via the transmission path is input to the header detector 201 to detect its header. Since the detected node number (N=2) matches the own node number (2) and bit A=0, the detector 201 opens the gate 203 and closes the gates 202 and 206 to output that packet in only the terminal direction.

18. The packet output from the separation/insertion unit II 905 in the terminal direction is sent to and received by the terminal 625 via the sub transmission path.

When the transmission band in this case is calculated under the same conditions in the paragraph of "Description of the Related Art", i.e., that the transmission band per transmission path and that of the sub transmission path between each terminal and node apparatus are T bps, the communication rate throughout the entire route from 1. to 18. above is T bps. Hence, the communication band of the communication from the terminal 612 to the terminal 625 is T bps.

As described above, when a packet is transmitted to a terminal connected to the downstream neighboring node apparatus, the packet makes its journey along a route that goes around the ring network once. In this way, the node apparatus to which the source terminal is connected can send a packet to the downstream node apparatus via an arbitrary parallel transmission path and, hence, the problem of narrow communication band can be solved.

In order to realize such circulating routing, when a packet is transmitted to a terminal connected to the downstream neighboring node apparatus, the non-separation bit is set in the header of that packet, and is sent to the downstream node apparatus via an arbitrary transmission channel. Upon reception of the packet, the downstream node apparatus disables the non-separation bit without separating the packet toward the destination terminal, and sends it to the next node apparatus. With this processing, the destination node does not separate the packet at its first arrival, but can separate it at the next arrival after the packet has traveled around the ring network once.

More specifically, it is important to inhibit a communication in which the packet reaches the destination after passing through the switch means only once. When the packet reaches the destination after passing through the switch means only once, the communication band is limited by the band that can output a signal from the input channel of the signal to a channel to which the destination is connected.

In order to realize a signal that can reach the destination after passing through the switch means only once in a network that inhibits a communication in which a signal reaches the destination after passing through the switch means only once, the network need only be arranged so that the signal reaches the destination after passing through the switch means twice or more.

In order to make a signal reach the destination after passing through the switch means twice or more, a means which gives, to the signal, information that can discriminate if the signal has gone through the switch means twice or more, need only be added.

Such means may be added in various ways. For example, the following arrangements are available: information indicating the number of times that a signal has gone through the switch means is rewritten every time the signal goes through the switch means; and the number of times that a signal has to go through the switch means is designated in advance in a signal, and the switch means looks up and rewrites that number to indicate the remaining number of times that the signal has to go through the switch means by decrementing it or by adding information indicating the number of times that the signal has gone through the switch means. In either arrangement, even when a signal can reach the destination after passing through the switch means only once, the switch controls not to output that signal using a channel to which the destination is connected, but to output it using an arbitrary channel, thus eliminating the above-mentioned limitation on the band.

In this embodiment, the separation/insertion unit II (header detector 201, gates 202, 203, and 206, and header rewrite unit 207) receives a packet that has gone through a selector serving as a switch means at least once. Also, in this embodiment, the switch means outputs a packet which arrives the switch means for the first time using an arbitrary channel, and outputs a packet using a channel to which the destination terminal (the separation/insertion unit II to which that terminal is connected) is connected if the packet arrives that switch means for the second time, and the own switch means is the last one before the packet reaches the destination separation means. Furthermore, in this embodiment, a packet input to the network with a non-separation bit=1 as the information indicating that the packet has not passed through the switch means yet is input to the header rewrite unit of the separation/insertion unit II after it has gone through the switch means once, and is assigned a non-separation bit=0 as the information indicating that the packet has gone through the switch means once or the packet can be separated. When a packet with a non-separation bit=1 as the information indicating that the packet has not passed through the switch means yet is input to the separation/insertion unit II, this means that the packet has gone through the switch means once, and when a packet with a non-separation bit=0 as the information indicating that the packet has gone through the switch means once is input, this means that the packet has gone through the switch means twice or more.

Second Embodiment

Figure 11:
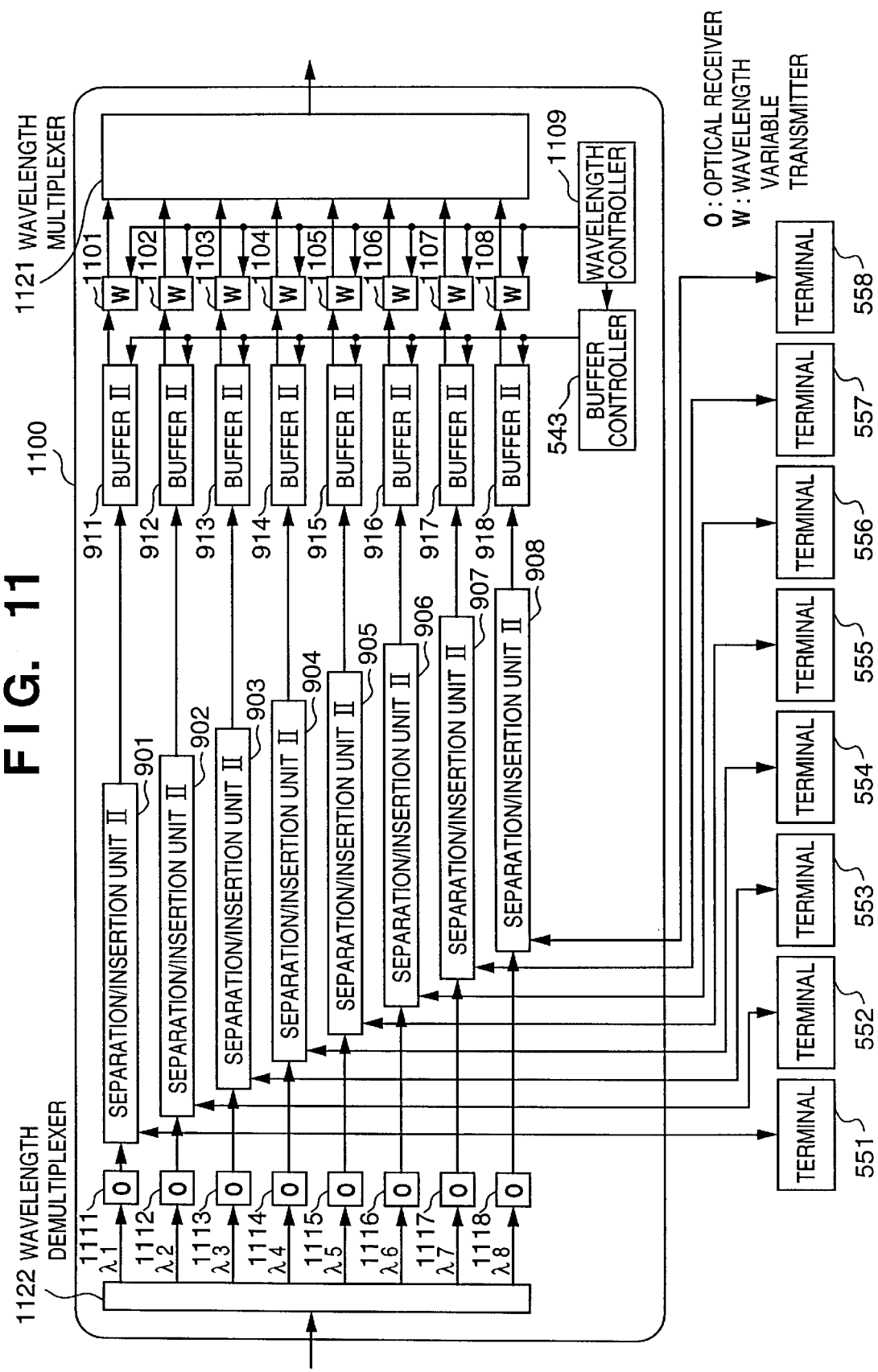
FIG. 11 is a block diagram showing the arrangement of a node apparatus according to the second embodiment of the present invention.

The second embodiment of the present invention will be described below. FIG. 11 shows the arrangement of a node apparatus of this embodiment. The first embodiment uses a space division switch as the switch 541, and space division parallel multiplexing transmission paths such as a ribbon fiber as the transmission paths, while this embodiment exemplifies a case wherein signals are multiplexed on a single optical fiber by wavelength multiplexing, and are switched between two opposing node apparatuses.

In FIG. 11, reference numerals 1101 to 1108 denote wavelength variable transmitters, each of which is an optical transmitter that converts an input signal into an optical signal of an arbitrary wavelength by controlling the injection current of a laser diode, and outputs the optical signal. Reference numeral 1109 denotes a wavelength controller, which sets the transmission wavelengths of the wavelength variable transmitters 1101 to 1108 at arbitrary wavelengths in accordance with the wavelength control patterns shown in FIG. 4. For example, by cyclically changing control addresses A1 to A8, a signal input to an input terminal IN1 of the wavelength variable transmitter 1101 is converted into an optical signal of a wavelength $\lambda 1$, into an optical signal of a wavelength $\lambda 2$ in the next cycle, and into signals of wavelengths $\lambda 3$, $\lambda 4$, $\lambda 5$, $\lambda 6$, $\lambda 7$, and $\lambda 8$ in turn. Also, the wavelength variable transmitter 1102 cyclically converts the input signal input to an input terminal IN2 into optical signals of the wavelengths $\lambda 1$, $\lambda 2$, $\lambda 3$, $\lambda 4$, $\lambda 5$, $\lambda 6$, $\lambda 7$, and $\lambda 8$ in turn. The same applies to other wavelength variable transmitters 1103 to 1108. The wavelength change cycle is set at, e.g., an integer multiple of the packet length. More specifically, the transmission wavelength is repetitively changed in units of several packets. The wavelength control patterns used are not limited to those shown in FIG. 4 as long as more than one wavelength variable transmitters do not simultaneously use an identical wavelength upon transmission. Reference numeral 1121 denotes a wavelength multiplexer which multiplexes optical signals output from the respective wavelength variable transmitters onto a single optical fiber, and outputs these signals onto an external optical fiber transmission path. Reference numeral 1122 denotes a wavelength demultiplexer, which demultiplexes optical signals of the wavelengths λ1 to λ8 sent from the external optical fiber transmission path into the individual wavelengths. Reference numerals 1111 to 1118 denote optical receivers, which respectively convert optical signals of the wavelengths λ1 to λ8 demultiplexed by the wavelength demultiplexer 1122 into electrical signals. Other arrangements of the node apparatus are the same as those in the first embodiment, and the same reference numerals denote the same parts.

Figure 6:
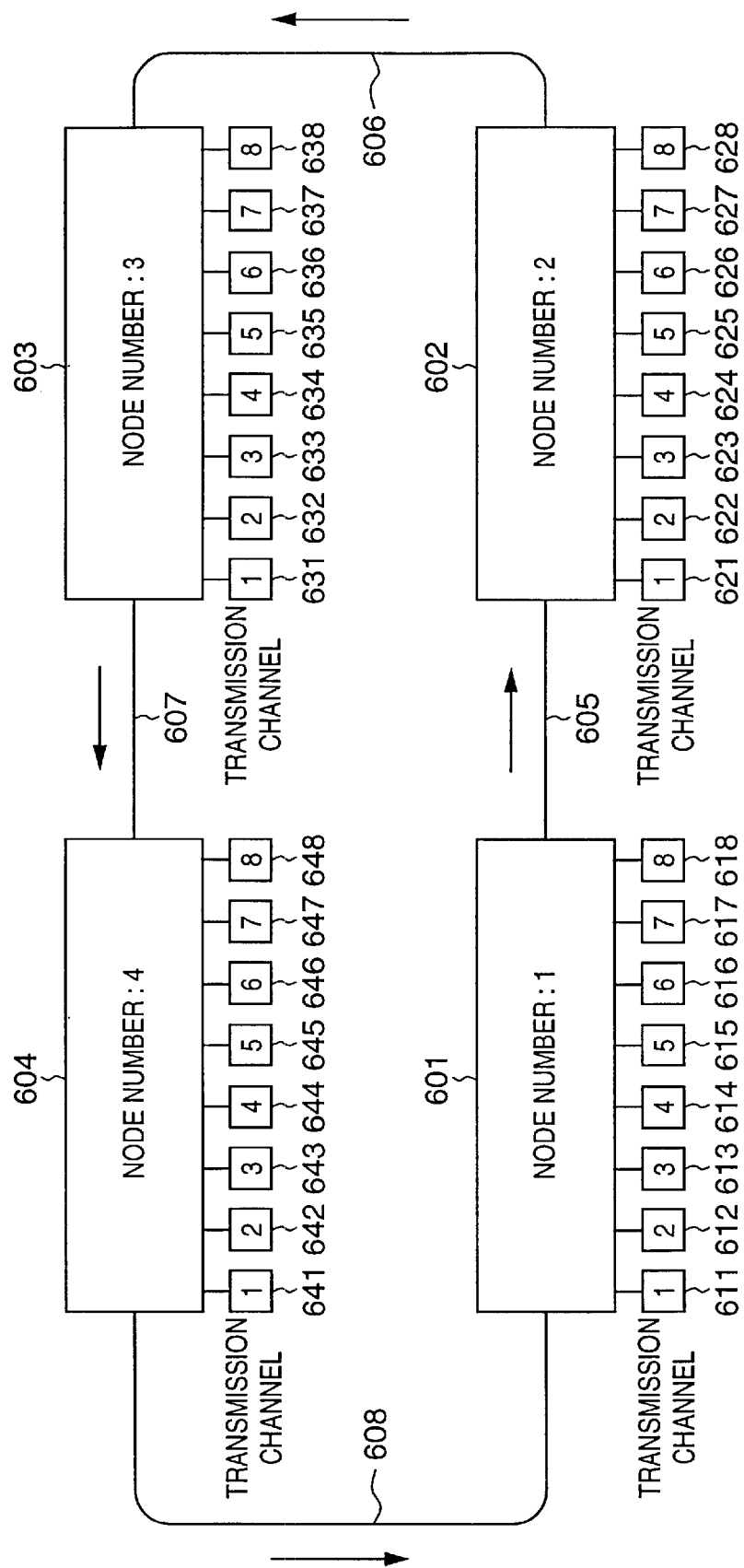
FIG. 6 is a diagram showing the arrangement of a network.
Figure 7:
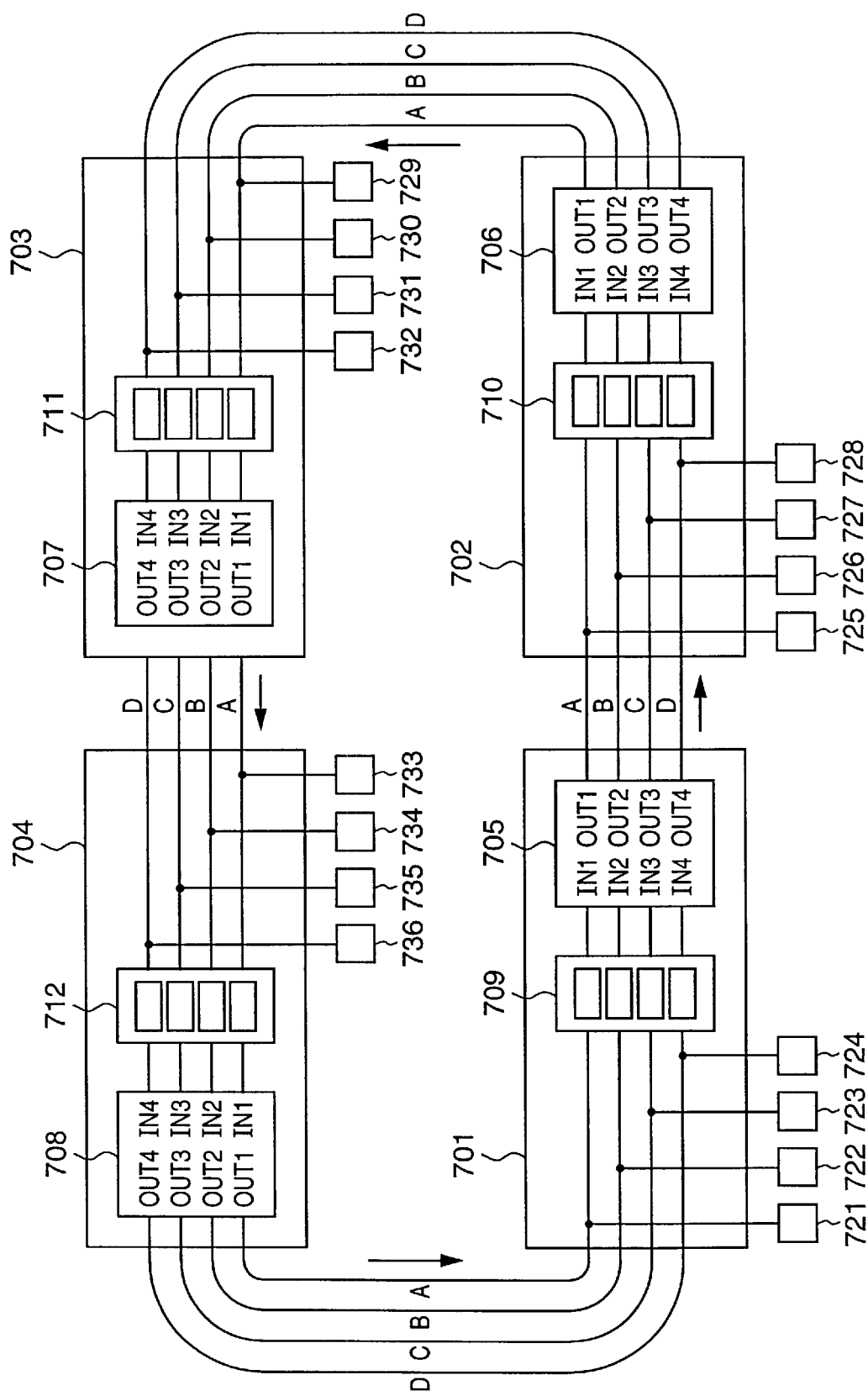
FIG. 7 is a diagram showing the communication principle of the network.
Figure 8:
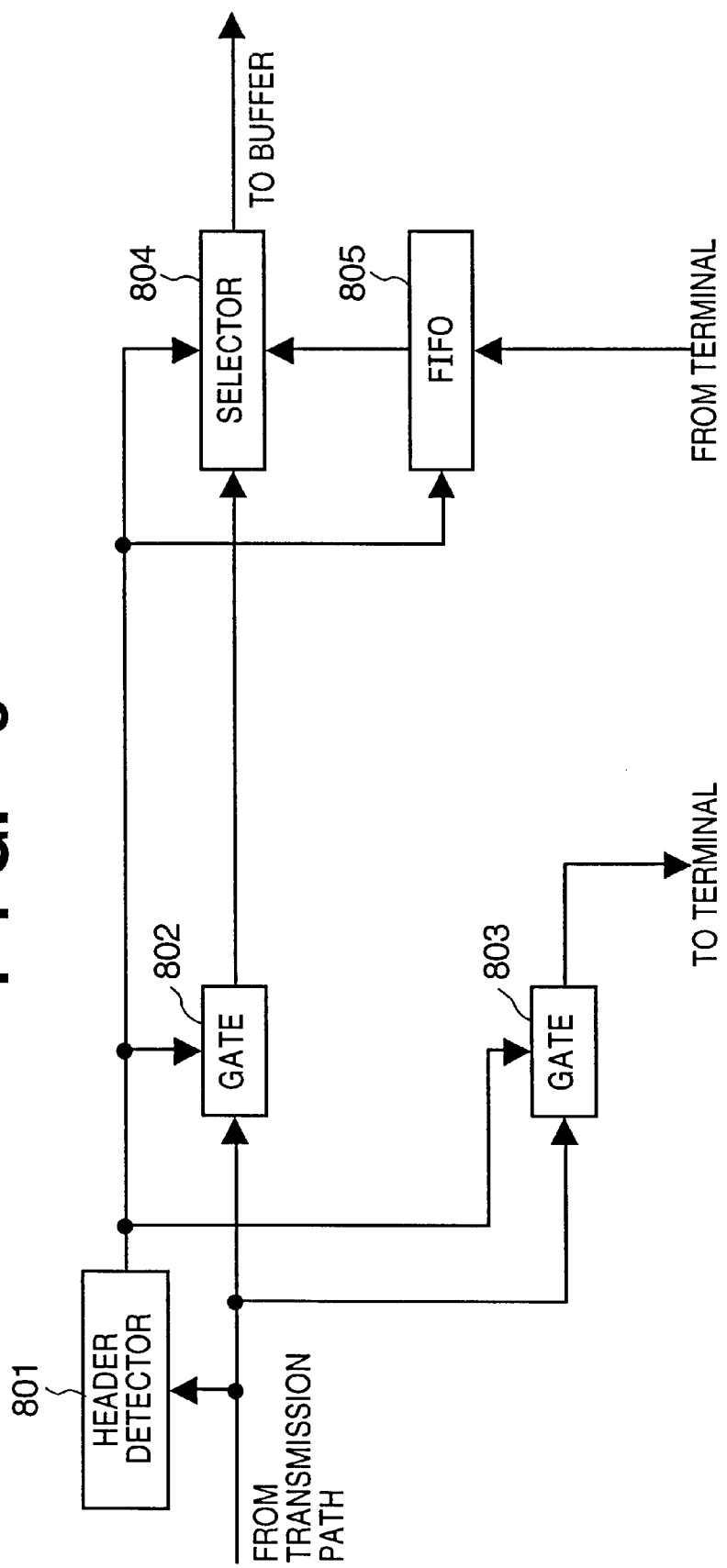
FIG. 8 is a block diagram showing the internal arrangement of a separation/insertion unit in the reference example of the conventional node apparatus.

A one-to-one communication in the network shown in FIG. 6, which uses the node apparatuses of this embodiment, will be explained below. Assume that a signal is transmitted from a terminal 612 (own node number: 1, transmission channel number: 2) to a terminal 635 (own node number: 3, transmission channel number: 5).

1. The terminal 612 sets the terminal number (e.g., N=3, T=5) and bit A=0 in the header of a packet, and outputs that packet. The packet is input to the separation/insertion unit II 902 of the node apparatus 601 via the sub transmission path.

2. A selector 204 of the separation/insertion unit II 902 inserts the packet coming from the terminal in a space of a packet flow input from the transmission path, and outputs that packet flow to the buffer II 912.

3. The header detector 1002 of the buffer II 912 detects the header of the input packet. Since the detected node number (N=3) does not match the neighboring node number (2), the detector 1002 designates an arbitrary storage area. In this case, for example, the detector 1002 designate storage area 1. The write address counter 1003 generates a write address upon reception of that information, and writes the packet in storage area 1 of the buffer memory 1001.

4. At this time, the wavelength controller 1109 controls to cyclically change the control addresses A1 to A8 at predetermined periods in accordance with the wavelength control pattern shown in FIG. 4, and supplies the control address to the buffer controller 543. When the buffer controller 543 controls to read out the packet from storage area 1 of the buffer II 912 when the control address=A8, the packet is input from the input terminal IN2 of the wavelength variable transmitter 1102, is converted into an optical signal of the wavelength λ1, and is output onto the optical fiber transmission path 605 via the wavelength multiplexer 1121.

5. The packet transmitted via the transmission path is output from an output terminal of the wavelength λ1 by the wavelength demultiplexer 1122 of the node apparatus 602, and is converted into an electrical signal by the optical receiver 1111. The electrical signal is then output to the separation/insertion unit II 901. In the separation/insertion unit II 901, the header detector 201 detects the packet header. Since the detected node number (N=3) does not match the stored own node number (2), the detector 201 opens the gate 202 and closes the gates 203 and 206 to output that packet to the selector 204.

6. The packet output to the selector 204 of the separation/insertion unit II 901 is input to the buffer II 911 via the selector 204. Since the node number (N=3) detected by the header detector 1002 from the packet header matches the stored neighboring node number (3), the detector 1002 designates a storage area with the same number as the detected transmission channel number (T=5). In this case, since the transmission channel number is 5, the packet is stored in storage area 5.

7. The packet stored in storage area 5 of the buffer II 911 is read out when the control address=A5 in turn. At that time, since the transmission wavelength of the wavelength variable transmitter 1101 is set at λ5, the packet is converted into an optical signal of the wavelength λ5, and is output onto the optical fiber transmission path 606.

8. The optical signal input to the node apparatus 603 via the transmission path is output from an output terminal of the wavelength λ5 of the wavelength demultiplexer 1122, and is converted into an electrical signal by the optical receiver 1115. In the separation/insertion unit II 901, the header is detected by the header detector 201. In this case, since the detected node number (N=3) matches the own node number (3) and bit A=0, the detector 201 opens the gate 203 and closes the gates 202 and 206 to output that packet in only the terminal direction.

9. The packet output from the separation/insertion unit II 905 in the terminal direction is sent to and received by the terminal 635 via the sub transmission path.

A communication with a terminal connected to the downstream neighboring node apparatus will be explained below. Assume that a signal is transmitted from the terminal 612 (own node number: 1, transmission channel number: 2) to the terminal 625 (own node number: 2, transmission channel number 5).

1. The terminal 612 sets the terminal number (e.g., N=2, T=5) and bit A=1 in the header of a packet, and outputs that packet. The packet is input to the separation/insertion unit II 902 of the node apparatus 601 via the sub transmission path.

2. The selector 204 of the separation/insertion unit II 902 inserts the packet coming from the terminal in a space of a packet flow input from the transmission path, and outputs that packet flow to the buffer II 912.

3. The header detector 1002 of the buffer II 912 detects the header of the input packet. Since the non-separation bit (A) (A=1) is detected, the detector 1002 designates an arbitrary storage area. In this case, for example, storage area 1 is designated. Upon reception of this information, the write address counter 1003 generates a write address, and writes that packet in storage area 1 of buffer memory 1001.

4. At this time, the wavelength controller 1109 controls to cyclically change the control addresses A1 to A8 at predetermined periods in accordance with the wavelength control pattern shown in FIG. 4, and supplies the control address to the buffer controller 543. When the buffer controller 543 controls to read out the packet from storage area 1 of the buffer II 912 when the control address=A8, the packet is input from the input terminal IN2 of the wavelength variable transmitter 1102, is converted into an optical signal of the wavelength λ1, and is output onto the optical fiber transmission path 605 via the wavelength multiplexer 1121.

5. The packet transmitted via the transmission path is output from the output terminal of the wavelength λ1 of the wavelength demultiplexer 1122, and is converted into an electrical signal by the optical receiver 1111. The electrical signal is then output to the separation/insertion unit II 901. In the separation/insertion unit II 901, the header detector 201 detects the packet header. Since the detected node number (N=2) matches the own node number (2) and bit A =1, the detector 201 opens the gate 206 and closes the gates 202 and 203 to rewrite the non-separation bit (A) of the header to 0 by the header rewrite unit 207 and then output that packet to the selector 204.

6. The packet output to the selector 204 of the separation/insertion unit II 901 is input to the buffer II 911 via the selector 204. Since the node number (N=2) detected by the header detector 1002 from the packet header does not match the neighboring node number (3), the detector 1002 designates an arbitrary storage area. In this case, for example, storage area 2 is designated. Upon receiving the information, the address counter 1003 generates a write address, and writes that packet in storage area 2 in the buffer memory 1001.

7. At this time, the wavelength controller 1109 controls to cyclically change the control addresses A1 to A8 at predetermined periods in accordance with the wavelength control pattern shown in FIG. 4, and supplies the control address to the buffer controller 543. When the buffer controller 543 controls to read out the packet from storage area 2 of the buffer II 911 when the control address=A2, the packet is input from the input terminal IN1 of the wavelength variable transmitter 1101, is converted into an optical signal of the wavelength λ2, and is output onto the optical fiber transmission path 606 via the wavelength multiplexer 1121.

8. The packet transmitted via the transmission path is output from the output terminal of the wavelength λ2 of the wavelength demultiplexer 1122 of the node apparatus 603, and is converted into an electrical signal by the optical receiver 1112. The electrical signal is then output to the separation/insertion unit II 902. In the separation/insertion unit II 902, the header detector 201 detects the packet header. In this case, since the detected node number (N=2) does not match the stored own node number (3), the detector 201 opens the gate 202 and closes the gates 203 and 206 to output that packet in only the direction of the buffer II.

9. The packet output to the selector 204 of the separation/insertion unit II 902 is input to the buffer II 912 via the selector 204. Since the node number (N=2) detected by the header detector 1002 from the packet header does not match the stored neighboring node number (4), the detector 1002 designates an arbitrary storage area. In this case, for example, storage area 3 is designated. Upon reception of the information, the address counter 1003 generates a write address, and writes the packet in storage area 3 in the buffer memory 1001.

10. At this time, the wavelength controller 1109 controls to cyclically change the control addresses A1 to A8 at predetermined periods in accordance with the wavelength control pattern shown in FIG. 4, and supplies the control address to the buffer controller 543. When the buffer controller 543 controls to read out the packet from storage area 3 of the buffer II 912 when the control address=A2, the packet is input from the input terminal IN2 of the wavelength variable transmitter 1102, is converted into an optical signal of the wavelength λ3, and is output onto the optical fiber transmission path 607 via the wavelength multiplexer 1121.

11. The packet transmitted via the transmission path is output from the output terminal of the wavelength λ3 of the wavelength demultiplexer 1122 of the node apparatus 604, and is converted into an electrical signal by the optical receiver 1113. The electrical signal is then output to the separation/insertion unit II 903. In the separation/insertion unit II 903, the header detector 201 detects the packet header. In this case, since the detected node number (N=2) does not match the stored own node number (4), the detector 201 opens the gate 202 and closes the gates 203 and 206 to output that packet in only the direction of the buffer II.

12. The packet output to the selector 204 of the separation/insertion unit II 903 is input to the buffer II 913 via the selector 204. Since the node number (N=2) detected by the header detector 1002 from the packet header does not match the stored neighboring node number (1), the detector 1002 designates an arbitrary storage area. In this case, for example, storage area 4 is designated. Upon reception of the information, the address counter 1003 generates a write address, and writes the packet in storage area 4 in the buffer memory 1001.

13. At this time, the wavelength controller 1109 controls to cyclically change the control addresses A1 to A8 at predetermined periods in accordance with the wavelength control pattern shown in FIG. 4, and supplies the control address to the buffer controller 543. When the buffer controller 543 controls to read out the packet from storage area 4 of the buffer II 913 when the control address=A2, the packet is input from the input terminal IN3 of the wavelength variable transmitter 1103, is converted into an optical signal of the wavelength λ4, and is output onto the optical fiber transmission path 608 via the wavelength multiplexer 1121.

14. The packet transmitted via the transmission path is output from the output terminal of the wavelength λ4 of the wavelength demultiplexer 1122 of the node apparatus 601, and is converted into an electrical signal by the optical receiver 1114. The electrical signal is then output to the separation/insertion unit II 904. In the separation/insertion unit II 904, since the detected node number (N=2) does not match the stored own node number (1), the header detector 201 opens the gate 202 and closes the gates 203 and 206 to output that packet in only the direction of the buffer II.

15. The packet output to the selector 204 of the separation/insertion unit II 904 is input to the buffer II 914 via the selector 204. Since the node number (N=2) detected by the header detector 1002 from the packet header matches the stored neighboring node number (2) and bit A=0, the detector 1002 designates a storage area with the same number as the detected transmission channel number (T=5). In this case, since the transmission channel number is 5, the packet is stored in storage area 5.

16. At this time, the wavelength controller 1109 controls to cyclically change the control addresses A1 to A8 at predetermined periods in accordance with the wavelength control pattern shown in FIG. 4, and supplies the control address to the buffer controller 543. When the buffer controller 543 controls to read out the packet from storage area 5 of the buffer II 914 when the control address=A2, the packet is input from the input terminal IN4 of the wavelength variable transmitter 1104, is converted into an optical signal of the wavelength λ5, and is output onto the optical fiber transmission path 605 via the wavelength multiplexer 1121.

17. The packet transmitted via the transmission path is output from the output terminal of the wavelength λ5 of the wavelength demultiplexer 1122 of the node apparatus 602, and is converted into an electrical signal by the optical receiver 1115. The electrical signal is then output to the separation/insertion unit II 905. In the separation/insertion unit II 905, since the detected node number (N=2) matches the own node number (1), and bit A=0, the header detector 201 opens the gate 203 and closes the gates 202 and 206 to output that packet in only the terminal direction.

18. The packet output from the separation/insertion unit II 905 in the terminal direction is sent to and received by the terminal 625 via the sub transmission path.

When the transmission band in this case is calculated under the same conditions in the paragraph of "Description of the Related Art", i.e., that the transmission band per transmission path and that of the sub transmission path between each terminal and node apparatus are T bps, the communication rate throughout the entire route from 1. to 18. above is T bps. Hence, the communication band of the communication from the terminal 612 to the terminal 625 is T bps.

Third Embodiment

The third embodiment of the present invention will be described below.

In the first and second embodiments described above, since each terminal that makes a communication outputs a cell with the header shown in FIG. 1, a communication that can solve the "problem that the communication band narrows in case of a communication to a terminal connected to the downstream neighboring node apparatus as compared to a communication to a terminal connected to a node apparatus other than the downstream neighboring node apparatus" can be attained.

However, since each terminal must output the cell with the header shown in FIG. 1, this imposes a limitation on an NIC (Network Interface Card) equipped in each terminal. More specifically, some of commercially available NICs (e.g., NICs for ATM) may be impossible to use in the above-mentioned embodiments. A method of avoiding such problem will be described in this embodiment.

Figure 12:
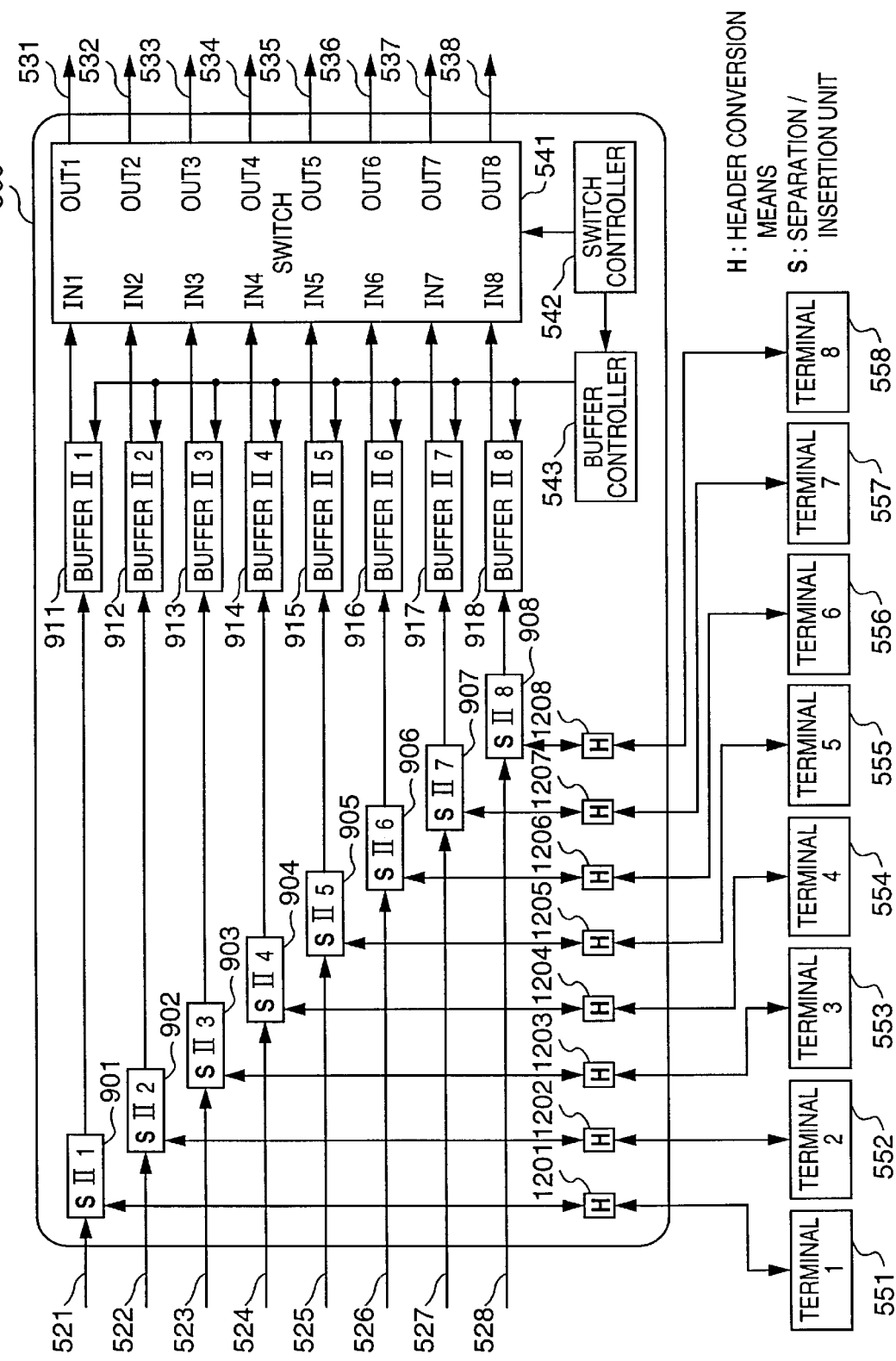
FIG. 12 is a block diagram showing the arrangement of a node apparatus according to the third embodiment of the present invention.

FIG. 12 shows the arrangement of a node of this embodiment. In FIG. 12, header conversion means 1201 to 1208 are inserted between the separation/insertion units and terminals (equipped with commercially available NICs) connected thereto, in addition to the arrangement shown in FIG. 9. Also, the same reference numerals in FIG. 12 denote the same parts as those in FIG. 9. Each of the header conversion means 1201 to 1208 converts the header format that can be output from a commercially available NIC into that shown in FIG. 1, and vice versa. For this purpose, each header conversion means has a conversion table (to be referred to as a header conversion table hereinafter) required for such conversion.

Figure 13:
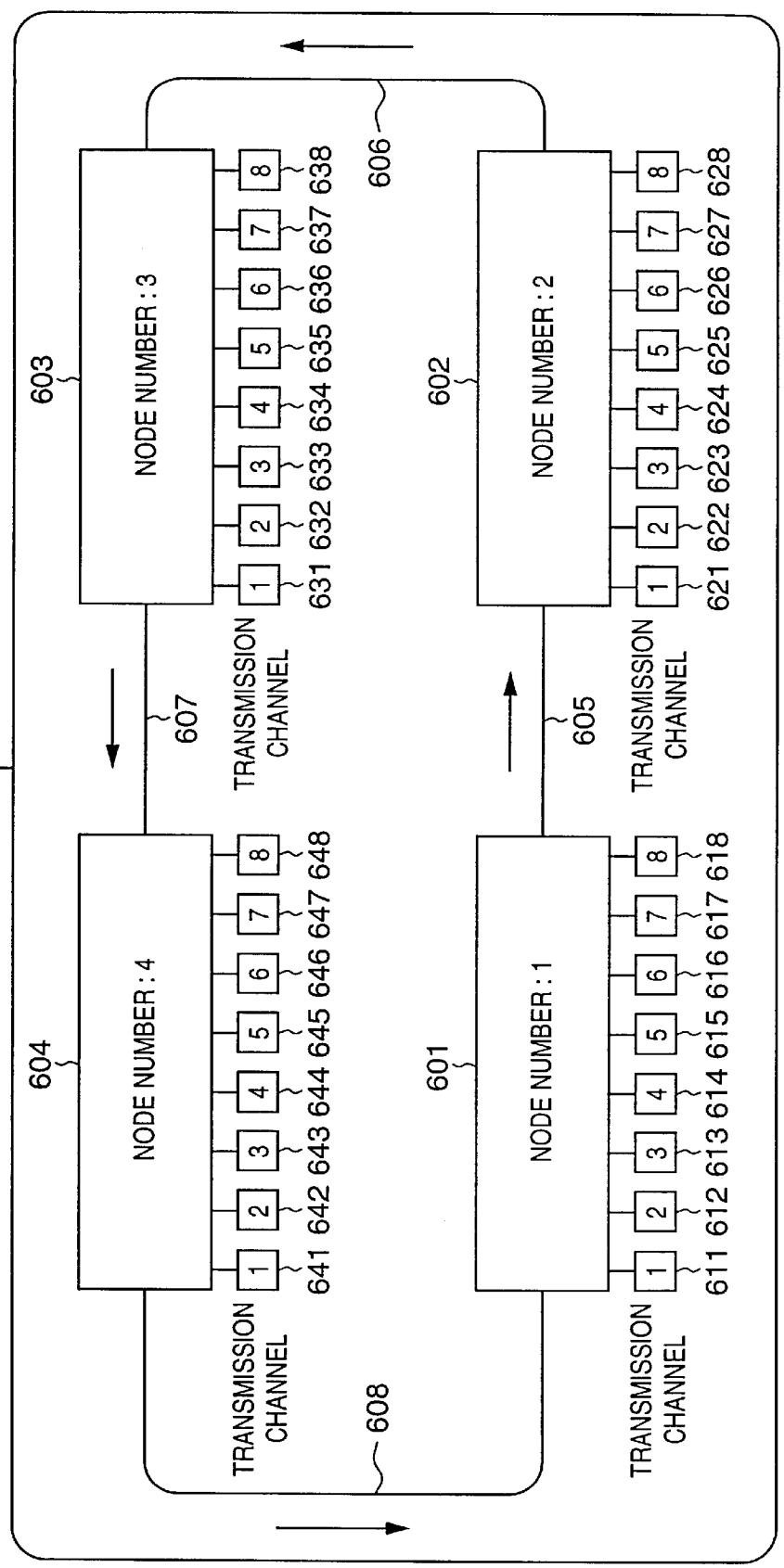
FIG. 13 is a diagram showing the arrangement of a network according to the third embodiment of the present invention.

FIG. 13 shows the network arrangement of this embodiment. In FIG. 13, at least one call accept & header convert means control module is inserted in the network. The same reference numerals in FIG. 13 denote the same parts as those in FIG. 6.

The location of the call accept & header convert means control module is not particularly designated in the network but may be arbitrarily determined as long as the module can make preliminary communications (to be described later) with terminals in accordance with a predetermined protocol, and also, as long as the module can perform the following control for the header conversion means in each node. For example, the call accept & header convert means control module may be located on either a certain terminal or a node apparatus.

In this embodiment, the call accept & header convert means control module can exchange information with each terminal in accordance with a predetermined procedure (preliminary communication protocol). More specifically, the module exchanges information in the following procedure.

1. Prior to a communication (actual communication), the terminal informs the call accept & header convert means control module of the source terminal (own terminal) information and destination terminal information of that actual communication.
2. The call accept & header convert means control module calculates a header to be used in the actual communication on the basis of the obtained source terminal information and destination terminal information, and supplies the header to the terminal. Assume that the header at that time can be set by a commercially available NIC.
3. The terminal adds the header obtained from the call accept & header convert means control module to a packet, and starts the actual communication.

Also, in this embodiment, the call accept & header convert means control module executes the following control on the basis of the source terminal information and destination terminal information.

1. The module sets a header conversion table for converting the header format sent to the terminal in the above-mentioned preliminary communication protocol into that shown in FIG. 1 in one of the header conversion means 1201 to 1208 connected to the source terminal.
2. The module sets a header conversion table for converting the header format shown in FIG. 1 into that which can be received by a commercially available NIC in one of the header conversion means 1201 to 1208 connected to the destination terminal.

Since such processing is executed prior to the actual communication, the terminals equipped with commercially available NICs can make communications according to the present invention. A description of the actual communication procedure after that processing will be omitted since it is substantially the same as the procedure described in the first embodiment, except that the following processes are added:

The header of a packet (with the header designated by the preliminary communication) to be sent from the source terminal to the node apparatus is converted into that in the format shown in FIG. 1 by the header conversion means connected to that terminal.

The header of the packet (with the header in the format shown in FIG. 1) to be sent from the node apparatus to the destination terminal is converted into that which can be received by a commercially available NIC by the header conversion means connected to that terminal.

Figure 14:
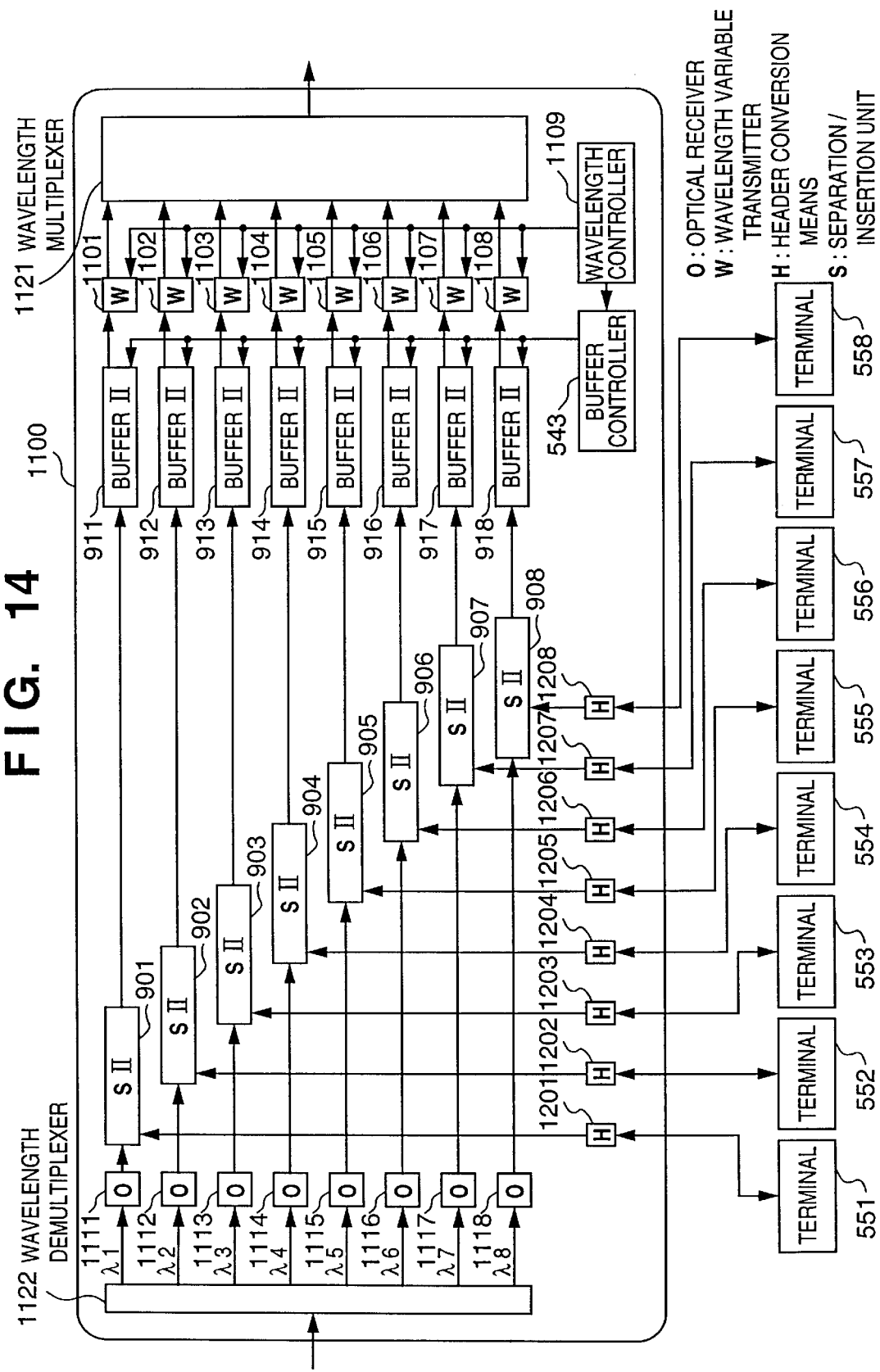
FIG. 14 is a block diagram showing another arrangement of a node apparatus according to the third embodiment of the present invention.

The same effects are expected when the header conversion means 1201 to 1208 are added to the node apparatus (FIG. 11) of the second embodiment, as shown in FIG. 14.

As described above, according to this embodiment, a terminal which is connected to a node apparatus that makes communications according to the present invention need not have any function of transmitting/receiving a packet having a specific header format for the communications of the present invention.

To recapitulate, according to the present invention since a packet is controlled to reach the destination after it has passed through the switch means twice or more, narrowing of the band to the destination that occurs when the packet arrives at the destination after it has passed through the switch means only once can be prevented.

In these embodiments, the node apparatus is constructed of hardware components. However, it is apparent that the node apparatus of the present invention may comprise a general computer processed by software programs to perform the functions of the present invention.

The present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A communication network which has a plurality of parallel channels, switch means which is connected to the plurality of channels and can output a signal input from each channel to one of the plurality of channels, and terminal devices communicated via the plurality of channels, the plurality of channels forming a ring network via said switch means, comprising:

input means for inputting the signal from each terminal device; and transmission means for transmitting the signal input by said input means to pass through said switch means not less than twice before the signal input by said input means reaches the destination terminal device.

2. The network according to claim 1, further comprising:

addition means for adding, to the signal, information indicating whether or not the signal has passed through said switch means not less than twice.

3. The network according to claim 1, wherein said switch means outputs the signal, which can reach the destination terminal device after the signal has passed through said switch means once, using an arbitrary one of the plurality of channels.

4. The network according to claim 1, wherein said switch means outputs the signal, which has passed through another switch means or own switch means more than once, and can reach the destination terminal device after the signal passes through the own switch once more, using the channel to which the destination terminal device is connected of the plurality of channels.

5. The network according to claim 1, further comprising:

separation means for connecting the terminal device to one of the plurality of channels, separating the signal to be output to the terminal device of signals sent via that channel from the channel, and outputting the separated signal to the terminal device.

6. The network according to claim 2, further comprising:

separation means for connecting the terminal device to one of the plurality of channels, separating the signal to be output to the terminal device of signals sent via that channel from the channel, and outputting the separated signal to the terminal device, and wherein said separation means separates the signal from the channel in accordance with the information.

7. The network according to claim 6, wherein said separation means can change the information.

8. The network according to claim 1, wherein said switch means comprises buffers which respectively store signals input form the plurality of channels, and independently output the stored signals in units of input channels, and a switch for switching connections between the outputs in units of input channels from said buffers, and the plurality of channels to which said switch means outputs signals.

9. The network according to claim 8, wherein said switch means comprises output channel variable transmission means arranged in correspondence with the outputs in units of input channels, and switches connections between the outputs in units of input channels and output channels by controlling said output channel variable transmission means to switch the output channels.

10. The network according to claim 8, wherein the outputs in units of input channels, and the output channels, are switched in accordance with a predetermined pattern which can prevent the outputs in units of input channels from being simultaneously connected to an identical output channel.

11. The network according to claim 1, wherein the terminal device is connected to the channel by a node apparatus.

12. The network according to claim 2, wherein the information is added by the terminal device.

13. The network according to claim 2, wherein the information is added by converting a signal output form the terminal device into a predetermined format.

14. A communication network which connects node apparatuses each for connecting a plurality of terminal devices in a ring pattern via a plurality of parallel channels, comprising:

at least two switch means each for switching a channel for transmitting a packet among the parallel channels;

determination means for determining if a transmitting terminal device which transmits the packet communicates with a receiving terminal device connected to a downstream neighboring node apparatus; and communication means for, when said determination means determines that said transmitting terminal device communicates with said receiving terminal device, transmitting the packet output from said transmitting terminal device to said receiving terminal device after the packet completes its journey around said communication network connected in the ring pattern at least once.

15. A communication network which connects node apparatuses each for connecting a plurality of terminal devices in a ring pattern via a plurality of parallel channels, each of said node apparatuses comprising:

separation means for separating a packet to be output to a terminal device connected from packets transmitted via the plurality of parallel channels;

switch means for outputting packets input from the plurality of parallel channels to arbitrary channels; and addition means for adding, to an input packet, information indicating if the input packet has passed through said switch means of the own node apparatus or another node apparatus not less than twice.

16. The network according to claim 15, wherein said addition means is included in said separation means.

17. A method of controlling a communication network which has a plurality of parallel channels, switch means which is connected to the plurality of channels and can output a signal input form each channel to one of the plurality of channels, and terminal devices communicated via the plurality of channels, the plurality of channels forming a ring network via said switch means, comprising:

the input step of inputting a signal from each terminal device; and the transmission step of transmitting the signal input by said input step to pass through said switch means not less than twice before the signal input by said input step reaches the destination terminal device.

18. A method of controlling a communication network which connects node apparatuses each for connecting a plurality of terminal devices in a ring pattern via a plurality of parallel channels, and comprises at least two switch means each for switching a channel for transmitting a packet among the parallel channels, comprising:

the determination step of determining if a transmitting terminal device which transmits the packet communicates with a receiving terminal device connected to a downstream neighboring node apparatus; and the communication step of transmitting the packet output from said transmitting terminal device to said receiving terminal device after the packet completes its journey around said communication network connected in the ring pattern at least once when it is determined in the determination step that said transmitting terminal device communicates with said receiving terminal device.

19. A method of controlling a communication network which connects node apparatuses each for connecting a plurality of terminal devices in a ring pattern via a plurality of parallel channels, and in which each of said node apparatuses comprises switch means for outputting packets input from the plurality of parallel channels to arbitrary channels, comprising:

the separation step of separating a packet to be output to a terminal device connected from packets transmitted via the plurality of parallel channels; and the addition step of adding, to an input packet, information indicating if the input packet has passed through said switch means of the own node apparatus or another node apparatus not less than twice.

20. A node apparatus which is used in a communication network which connects a plurality of node apparatuses each for connecting a plurality of terminal devices in a ring pattern via a plurality of parallel channels, comprising:

reception means for receiving packets transmitted via the plurality of parallel channels;

switch means for outputting the packets input from the plurality of parallel channels to arbitrary ones of the plurality of parallel channels;

determination means for determining if a packet received by said reception means has passed through said switch means of the own node apparatus or another node apparatus more than twice; and transmission means for transmitting the packet to a terminal device connected to said node apparatus or to another node apparatus in accordance with a determination result of said determination means.

21. The apparatus according to claim 20, wherein said determination means also determines if the packet received by said reception means is transmitted to a terminal device connected to the own node apparatus.

22. The apparatus according to claim 20, further comprising:

information addition means for adding, to the packet, information indicating if the packet has passed through said switch means not more than twice.

23. The apparatus according to claim 20, wherein said switch means has a plurality of input terminals and a plurality of output terminals, and said switch means connects the input and output terminals in accordance with a predetermined pattern with the input terminals being not simultaneously connected to an identical output terminal.

24. The apparatus according to claim 20, further comprising:

conversion means for converting a packet transmitted from the terminal device into a predetermined format which allows determination of said determination means.

25. A first node apparatus used in a communication network which connects a plurality of node apparatuses each for connecting a plurality of terminal devices in a ring pattern via a plurality of parallel channels, comprising:

reception means for receiving a packet transmitted from the terminal device connected to said first node apparatus;

determination means for determining if a destination of the packet received by said reception means is a terminal device connected to a second node apparatus which neighbors on the downstream side of said first node apparatus; and transmission means for transmitting the packet to said second node apparatus to make its journey around the ring communication network at least once in accordance with a determination result of said determination means.

26. The apparatus according to claim 25, wherein when said determination means determines that the destination of the packet is not said second node apparatus, said transmission means transmits the packet not to make its journey around the ring communication network once.

27. The apparatus according to claim 25, further comprising switch means having a plurality of input terminals and a plurality of output terminals corresponding to the plurality of parallel channels, and wherein said switch means switches and outputs packets input from the plurality of input terminals to arbitrary ones of the plurality of output terminals, and connects the input and output terminals in accordance with a predetermined pattern with the input terminals being not simultaneously connected to an identical output terminal.

28. A method of controlling a node apparatus which is used in a communication network which connects a plurality of node apparatuses each for connecting a plurality of terminal devices in a ring pattern via a plurality of parallel channels, and comprises switch means for outputting packets input from the plurality of parallel channels to arbitrary ones of the plurality of parallel channels, comprising:

the reception step of receiving packets transmitted via the plurality of parallel channels;

the determination step of determining if a packet received in the reception step has passed through said switch means of the own node apparatus or another node apparatus more than twice; and the transmission step of transmitting the packet to a terminal device connected to said node apparatus or to another node apparatus in accordance with a determination result in the determination step.

29. A method of controlling a first node apparatus used in a communication network which connects a plurality of node apparatuses each for connecting a plurality of terminal devices in a ring pattern via a plurality of parallel channels, comprising:

the reception step of receiving a packet transmitted from the terminal device connected to said first node apparatus;

the determination step of determining if a destination of the packet received in the reception step is a terminal device connected to a second node apparatus which neighbors on the downstream side of said first node apparatus; and the transmission step of transmitting the packet to said second node apparatus to make its journey around the ring communication network at least once in accordance with a determination result in the determination step.

30. The method according to claim 29, wherein the transmission step includes the step of transmitting the packet not to make its journey around the ring communication network once when it is determined in the determination step that the destination of the packet is not said second node apparatus.

31. A node apparatus which is used in a communication network which connects a plurality of node apparatuses each for connecting a plurality of terminal devices in a ring pattern via a plurality of parallel channels, and has switch means, having a plurality of input terminals and a plurality of output terminals, for connecting the input and output terminals in accordance with a predetermined pattern with the input terminals being not simultaneously connected to an identical output terminal, and outputting packets input from the plurality of parallel channels to arbitrary ones of the plurality of parallel channels, comprising:

reception means for receiving packets containing control information transmitted via the plurality of parallel channels;

determination means for determining based on the control information of a packet received by said reception means if the packet received by said reception means is transmitted to a terminal device connected to said node apparatus, or to another node apparatus; and conversion means for converting the packet transmitted from the terminal device connected to said node apparatus into a packet containing the control information which allows determination of said determination means.

32. The apparatus according to claim 31, wherein when a destination of a packet transmitted from the terminal device connected to said node apparatus is a node apparatus which neighbors on the downstream side of said node apparatus, said conversion means converts the packet transmitted from the terminal device connected to said node apparatus with the packet reaching the destination terminal device after the packet completes its journey around the ring communication network once.

33. The apparatus according to claim 31, wherein when a destination of a packet transmitted from the terminal device connected to said node apparatus is a node apparatus which neighbors on the downstream side of said node apparatus, said conversion means converts the packet transmitted from the terminal device connected to said node apparatus with the packet reaching the destination terminal device after the packet passes through said switch means of the own node apparatus or another node apparatus not less than twice.

34. The apparatus according to claim 33, wherein the control information includes information indicating whether a packet has passed through said switch means of the own node apparatus or another node apparatus not less than twice.

35. A method of controlling a node apparatus which is used in a communication network which connects a plurality of node apparatuses each for connecting a plurality of terminal devices in a ring pattern via a plurality of parallel channels, and has switch means, having a plurality of input terminals and a plurality of output terminals, for connecting the input and output terminals in accordance with a predetermined pattern with the input terminals being not simultaneously connected to an identical output terminal, and outputting packets input from the plurality of parallel channels to arbitrary ones of the plurality of parallel channels, comprising:

the reception step of receiving packets containing control information transmitted via the plurality of parallel channels;

the determination step of determining based on the control information of a packet received in the reception step if the packet received in the reception step is transmitted to a terminal device connected to said node apparatus, or to another node apparatus; and the conversion step of converting the packet transmitted from the terminal device connected to said node apparatus into a packet containing the control information which allows determination in the determination step.

* * * * *

UNITED STATES PATENT AND TRADEMARK OFFICE
CERTIFICATE OF CORRECTION

PATENT NO. : 6,392,991 B1
DATED : May 21, 2002
INVENTOR(S) : Yamamoto et al.

It is certified that error appears in the above-identified patent and that said Letters Patent is hereby corrected as shown below:

Column 10,
Line 48, "6." should begin as a new paragraph.

Column 11,
Line 58, "OUTS" should read -- OUT5 --

Signed and Sealed this

Twenty-seventh Day of August, 2002

Attest:

JAMES E. ROGAN
Attesting Officer  Director of the United States Patent and Trademark Office